US011926489B2

(12) United States Patent
Wade

(10) Patent No.: US 11,926,489 B2
(45) Date of Patent: Mar. 12, 2024

(54) VACUUM PLATE, SHEET MATERIAL HANDLING APPARATUS COMPRISING SUCH VACUUM PLATE, AND METHOD FOR MAKING THE PLATE

(71) Applicant: Colin Maxwell Wade, Bury Saint Edmunds (GB)

(72) Inventor: Colin Maxwell Wade, Bury Saint Edmunds (GB)

(73) Assignee: Kongsberg Precision Cutting Systems Belgium BV, Ghent (BE)

( * ) Notice: Subject to any disclaimer, the term of this patent is extended or adjusted under 35 U.S.C. 154(b) by 706 days.

(21) Appl. No.: 16/981,385

(22) PCT Filed: Mar. 18, 2019

(86) PCT No.: PCT/IB2019/052182
§ 371 (c)(1),
(2) Date: Sep. 16, 2020

(87) PCT Pub. No.: WO2019/175854
PCT Pub. Date: Sep. 19, 2019

(65) Prior Publication Data
US 2021/0002085 A1  Jan. 7, 2021

(30) Foreign Application Priority Data
Mar. 16, 2018 (GB) .................................... 1804299

(51) Int. Cl.
*B25B 11/00* (2006.01)
*B21D 28/02* (2006.01)
*B21D 28/34* (2006.01)
*B25J 15/06* (2006.01)
(Continued)

(52) U.S. Cl.
CPC ............. *B65G 47/91* (2013.01); *B21D 28/02* (2013.01); *B21D 28/34* (2013.01); *B25B 11/005* (2013.01);
(Continued)

(58) Field of Classification Search
CPC .... B25J 15/0683; B66C 1/0231; B66C 1/025; B25B 11/005; B65H 3/0816;
(Continued)

(56) References Cited

U.S. PATENT DOCUMENTS 4,931,341 A * 6/1990 Haffer ................... B66C 1/0212
428/137
5,002,599 A 3/1991 McMaster et al.
(Continued)

FOREIGN PATENT DOCUMENTS

CN 202924372 U 5/2013
CN 203680306 U 7/2014
(Continued)

OTHER PUBLICATIONS

JPS61229730A—Machine Translation (Year: 1986).*
(Continued)

*Primary Examiner* — Dean J Kramer
(74) *Attorney, Agent, or Firm* — Brown & Brown IP Law PLLC

(57) ABSTRACT

A vacuum plate which may be used in a system in which sheet material articles are handled by a vacuum plate. The vacuum plate comprises a first wall, a plurality of bores in the first wall, and at least one air outlet for connection to a source of vacuum pressure for applying a vacuum pressure to the bores. The first wall provides, in use, a vacuum lifting surface for pulling and holding the sheet material article to the vacuum surface when vacuum pressure is applied to the bores. Each bore comprises a flared opening terminating at the vacuum surface for admitting air pulled through the bore by the applied vacuum pressure, and opposite this opening, an exit for the air pulled through the bore, this exit being surrounded by a rim that extends above a surrounding surface of the second side of the first wall.

20 Claims, 14 Drawing Sheets

(51) Int. Cl.
- B32B 3/12 (2006.01)
- B32B 7/12 (2006.01)
- B32B 15/04 (2006.01)
- B65G 47/91 (2006.01)
- B65H 3/08 (2006.01)
- B65G 47/90 (2006.01)

(52) U.S. Cl.
CPC ....... B25J 15/0616 (2013.01); B25J 15/0683 (2013.01); B32B 3/12 (2013.01); B32B 7/12 (2013.01); B32B 15/04 (2013.01); B65H 3/0816 (2013.01); B65H 3/0883 (2013.01); B65G 47/90 (2013.01); B65G 2249/04 (2013.01); B65G 2249/045 (2013.01); B65H 3/08 (2013.01); B65H 3/085 (2013.01); B65H 2406/351 (2013.01)

(58) Field of Classification Search
CPC ............ B65H 3/0883; B65H 2406/351; B21D 28/02; B21D 28/34
USPC ....................................................... 294/188
See application file for complete search history.

(56) References Cited

U.S. PATENT DOCUMENTS

| | | | |
|---|---|---|---|
| 5,259,859 A * | 11/1993 | Claassen | C03B 40/005 65/289 |
| 7,024,978 B1 | 4/2006 | Helinski | |
| 7,810,772 B2 * | 10/2010 | Sato | H05K 3/303 248/363 |
| 2005/0150338 A1 | 7/2005 | Elynuik | |
| 2010/0037672 A1 | 2/2010 | Ito et al. | |
| 2013/0127192 A1 | 5/2013 | Regan et al. | |

FOREIGN PATENT DOCUMENTS

| | | |
|---|---|---|
| CN | 206345467 U | 7/2017 |
| DE | 10 2004 046 575 A1 | 4/2006 |
| EP | 1 722 410 A1 | 11/2006 |
| JP | S57-208250 A | 12/1982 |
| JP | S61229730 A * | 10/1986 |
| JP | H10-86086 A | 4/1998 |
| JP | 2008-073788 A | 4/2008 |
| WO | 2008/087796 A1 | 7/2008 |

OTHER PUBLICATIONS

International Search Report and Written Opinion (Application No. PCT/IB2019/052182) dated Jun. 28, 2019.
GB Search Report (Application No. 1804299.4) dated Sep. 13, 2018.
Machine translation of JPS 61-229730.

* cited by examiner

VACUUM PLATE, SHEET MATERIAL HANDLING APPARATUS COMPRISING SUCH VACUUM PLATE, AND METHOD FOR MAKING THE PLATE

BACKGROUND a. Field of the Invention

The present invention relates to a vacuum plate which may be used in a vacuum plate sheet material handling system in which sheet material articles are handled by the vacuum plate, for example by being lifted, held down, moved or deposited by the vacuum plate.

b. Related Art

There is often a need in a manufacturing operation to individually handle sheet material articles, for example, paper products, semi-rigid sheet plastic, sheet metal, paper-backed foam board, plywood sheeting, solid cardboard, and corrugated cardboard and any other types of sheet materials which in a production environment may need to be cut and handled by machinery. A process step may be used to modify the material, or the material may simply be moved. The sheet material may, for example, be cut, creased, folded, embossed, printed upon, transported or stacked. The sheet material may need to be held down on a processing surface, for example a cutting table, a printing table or other type of processing work station, or lifted from an input stack of sheets, moved and deposited on aa processing surface, as part of the process. Other sheet material handling system involve transporting a sheet material article on cylindrical surface of a rotating roller. Often, there is a need to pull the sheet material article to a surface, and this may be done by applying a vacuum pressure through the surface through a set of holes in the surface. In this application, all such vacuum surfaces, whether planer, curved or cylindrical, of any orientation for applying a suction lifting force or a suction hold-down force, will be referred to as a "vacuum plate".

A specific example of a prior art work stations that may be used to cut or score fold lines in cardboard, are those supplied by Esko-Graphics bvba (see https://www.esko-.com/en/products/kongsberg-cutting-tables). The workstation has an upwardly facing flat vacuum plate perforated across its surface with an array of vacuum holes to provide a planar vacuum hold-down surface. Cuts in sheet material, held down by suction through the holes on the vacuum plate, are made by a reciprocating vertical blade that is moved on a 2-axis Cartesian robotic actuator that moves over the work surface. Score lines can be formed in a similar manner by a scoring wheel mounted to the actuator.

These work stations can be used with robotic sheet material handlers that comprise a machine vision system and a sheet handling apparatus comprising a vacuum sheet handler apparatus, for example a vacuum lifter apparatus (also called a suction lifting apparatus) that provides a downwardly oriented, planar vacuum lifting surface (also called a suction lifting surface), and an actuation system for lifting, horizontally moving and lowering the planar vacuum lifting surface. Any such actuation system will, for convenience, be referred to below as a "vacuum sheet handling actuation system". Examples of vacuum plates having downwardly oriented vacuum lifting surfaces include a flat metallic plate, which is typically square or rectangular, perforated with an array of vacuum holes. The holes are connected to a source of vacuum pressure for applying vacuum suction through an array of holes in the plate.

All such vacuum hold-down surfaces and vacuum lifting surfaces, whether planar, curved or cylindrical, in which suction is applied through a plurality of holes in a surrounding surface, will be referred to as a "vacuum surface".

The actuation system is configured to move the vacuum sheet handling apparatus in opposite horizontal linear directions along both the X- and Y-directions, and in both directions, up or down, along the vertical (Z-) direction. The actuation system may be a robotic arm with multiple degrees of freedom of movement and rotation at a manipulating end of the arm. The vacuum plate may be supported centrally at a manipulating end of the arm. Such an arm may lift and deposit sheet material within the reach of the arm anywhere on the processing work station and adjacent stacking work stations, within the reach of the arm.

Other types of robotic sheet material handlers may alternatively be used, for example, a linearly movable gantry that spans the cutting and scoring work station, beneath which is supported the vacuum sheet handling apparatus. This is a simpler and more economical way for lifting, moving and depositing sheet material, but is limited to drawing from or forming a stack along the line of travel of the gantry.

These production systems work well, but are limited in their speed of movement owing to the weight of the vacuum sheet handling apparatus and the actuating power of the actuation system. The initial sheet stock may have standard dimensions, such as, for example, 3.2 m×1.6 m. It is also difficult to provide sufficient vacuum suction to an array of 40,000 holes, each about 1 mm to 1.5 mm in diameter, all of which draw air prior to lifting, and many of which remain open around the edges of the sheet material article during lifting These problems have become more acute as the speed of processing work stations has increased. From an economic perspective, it has also become ever more important to make greater utilization of processing work stations as their capability and cost has increased.

The most time-consuming and costliest aspect of manufacturing vacuum plates such as these is forming the vacuum holes through the lower plate. The holes are normally between about 1 mm and 1.5 mm in diameter, and most commonly about 1.3 mm diameter. The diameter is therefore comparable to the thickness of the metallic plate, which may be 1.5 mm thick. Although the drilling process can be automated, for example with a CNC controlled drilling machine, it still takes on average 3 s to 4 s to drill a hole.

One known way of improving vacuum lifting (i.e. suction lifting) force, without increasing vacuum capacity, is to provide a chamfer to the hole. This, however, doubles the time needed to form the holes. A second drill is used to provide a chamfer around the air entrance to hole, which widens the air entrance in order to increase the suction pressure that may be applied to an object sucked up against the hole. The minimum time needed to drill holes in a vacuum plate 1.6 m by 3.2 m will be about 120,000 seconds to 160,000 seconds (i.e. from 1 day, 9 hours to nearly 2 days), and potentially double this if holes are to be chamfered. In practice, it takes longer than this, because a 1.3 mm drill bit is only capable of drilling about 1000 holes before it becomes worn and must be replaced. A worn bit is more likely to break and results in poor quality holes having attached burrs, which impede airflow.

There is therefore a need to keep the weight of the vacuum plate as low as possible whilst maximising vacuum suction to the array of holes. However, there is also a need to reduce the manufacturing cost of vacuum plates.

SUMMARY OF THE INVENTION

According to the invention, there is provided a vacuum plate handling a sheet material article, the vacuum plate comprising a first wall, a plurality of vacuum holes in the first wall each of said holes being defined by a bore extending through the first wall between opposite first and second sides of the first wall, and at least one air outlet for connection to a source of vacuum pressure for applying a vacuum pressure to said bore from the second side of the first wall whereby the first wall provides, in use, a vacuum surface for pulling and holding said article to the vacuum surface when said vacuum pressure is applied to said bore, wherein said bore comprises:
 a flared entrance terminating at the vacuum surface for admitting air pulled through said bore by said applied vacuum pressure; and
 opposite said entrance, an exit for said air pulled through said bore, said exit being surrounded by a rim that extends above a surrounding surface of the second side of the first wall.

Also according to the invention, there is provided a vacuum sheet material handling apparatus for handling sheet material, comprising a vacuum plate and a source of vacuum pressure, the vacuum plate comprising a first wall, a plurality of holes in the first wall extending between opposite first and second sides of the first wall, the source of vacuum pressure being configured to apply a vacuum pressure to said holes from the second side of the first wall, the first wall providing, in use, a vacuum surface for pulling and holding said article to the vacuum surface when said vacuum pressure is applied to said holes, each hole being defined by a bore extending through the first wall, wherein said bore comprises:
 a flared entrance terminating at the vacuum surface for admitting air pulled through said hole by said applied vacuum pressure; and
 opposite said entrance, an exit for said air pulled through said hole, said exit being surrounded by a rim that extends above a surrounding surface of the second side of the first wall.

In a preferred embodiment of the invention, each bore has a bore axis and the bore has circular symmetry about said bore axis.

Most preferably, the bore axis extends at right angles to parallel surfaces of the first and second sides of the first wall.

Each bore may be fully recessed within the vacuum surface.

The first wall may be of a metallic material, in which case the rim is a tubular projection of this metallic material.

The tubular projection will, in general, have opposite inner and outer surfaces, the inner surface providing an extension of the bore above the level of said surrounding surface.

The inner and outer surfaces are preferably substantially concentric about an axis of the bore.

The tubular projection may extend substantially perpendicularly away from the surrounding surface around the projection.

The flared opening most preferably comprises a stepped recess whereby a flared portion of the opening is recessed from the vacuum surface by a step in the vacuum surface. The opening is flared wider towards the vacuum surface. For example, if the vacuum plate is a lifting plate, then the entrance will be a downwardly flared entrance, and the recess will be an upwards recess defined by an upwards step.

The step in the vacuum surface preferably extends fully around the flared entrance.

The step in the vacuum surface preferably meets a flared portion of the flared entrance at substantially a right-angle.

The flared portion may be bell-shaped.

The vacuum plate may be formed from two parallel sheets (typically aluminium to minimize weight if the vacuum plate is to be movable, in use, however, stainless steel may alternatively be used if strength is more important), a first one of which providing the first wall, is perforated with the vacuum holes.

Therefore, the vacuum plate may further comprise a second wall, the first and second walls being spaced apart from each other in a substantially parallel orientation, the second wall comprising at least one hole providing said air outlet.

When a reinforcing structure is provided between the first and second walls, the reinforcing structure may be affixed by an adhesive to the surrounding surface of the second side of the first wall around each rim.

The sheets providing the first and second walls are preferably metallic sheets separated by a reinforcement structure in the form of a matrix or repetitive structure having cell walls that extend between, and that are affixed preferably by adhesive bonding to, opposite inward facing surfaces of the spaced apart metallic sheets. In a preferred embodiment of the invention, the matrix is a honeycomb structure having hexagonal cell walls. A side wall extends around the periphery of the opposed sheets and at least one vacuum air outlet is provided, usually in the top sheet. The hexagonal cell walls are perforated to permit lateral airflow within a substantially hollow interior of the vacuum plate.

A first end of the cell walls may be affixed by adhesive to the surrounding surface of the second side of the first wall, and a second end of the cell walls may be affixed by an adhesive to a first surface of the second wall.

Most preferably, the first ends of said cell walls skirt the rims of the plurality of holes.

In particular, it is preferred if no adhesive extends over each rim to impede airflow through the corresponding hole.

Optionally, the vacuum plate may have a modular construction, being formed from a plurality of adjacent, tiles each one of which has opposed first and second plates which are preferably metallic, for example aluminium although other relatively lightweight but strong materials may alternatively be used, such as glass reinforced plastic or graphite reinforced plastic. The tiles are modular, i.e. having the same form in outline so that the tiles may be joined together to provide on one side a vacuum surface, which may be either a vacuum lifting surface or a vacuum hold-down surface.

The opposed first and second plates are preferably spaced apart and bonded together by an internal reinforcement. In one preferred embodiment of the invention, the reinforcement is a honeycomb structure or matrix that provides an array of contiguous six-sided cells that extend between the opposed first and second plates. Each tile may, in general, be bounded by a peripheral wall and may comprise at least one dedicated vacuum air outlet so that the airflow through each tile from the vacuum holes to the vacuum air outlet is isolated from the airflow in adjacent tiles.

In another preferred embodiment, the reinforcing structure is provided by a grid of vertically extending interlaced linear walls that provide an array of contiguous square or rectangular cells that extend between the opposed first and second plates.

Preferably, the reinforcement structure extending between the opposed first and second plates is laterally perforated to allow lateral airflow across at least some of the extent, and preferably the full extent, of the reinforcing structure.

The vacuum plate may be a vacuum lifting plate, in which case the first wall is a lower wall providing, in use, a vacuum surface that is a vacuum lifting surface for lifting and holding the sheet material article to the vacuum lifting surface.

Alternatively, the vacuum plate may be a vacuum hold-down plate, in which case the first wall is an upper wall providing, in use, a vacuum surface that is a vacuum hold-down surface for pulling down and holding the sheet material article to the vacuum hold-down surface.

The vacuum surface may be substantially planar, or it may be a curved surface, for example a convexly curved surface or a concavely curved surface, either across its full lateral extent or a part of its lateral extent.

Also according to the invention, there is provided a method of making a vacuum plate for handling a sheet material article, the vacuum plate comprising a first wall, a plurality of vacuum holes in the first wall each of said holes being defined by a bore extending through the first wall between opposite first and second sides of the first wall, and at least one air outlet for connection to a source of vacuum pressure for applying a vacuum pressure to said bores from the second side of the first wall, the first wall providing, in use, a vacuum surface for pulling and holding said article to the vacuum surface when said vacuum pressure is applied to said bores wherein said the method comprises:

holding a metallic sheet between at least one aligned punch and die, the metallic sheet having opposite first and second sides and the punch extending along a punch axis and comprising around said axis: (i) a substantially V-shaped tip; (ii) extending axially away from the V-shaped tip a middle portion being substantially parallel with said axis; (iii) extending axially away from the middle portion, an expanded portion having a profile that flares away from said axis; and (iv) at the end of the expanded portion an axially extending step;

pressing the V-shaped tip of the punch into the first side of said held metallic sheet along a punching direction aligned with an axis of the die to pierce the metallic sheet and start to draw material of the metallic sheet into a die recess around said bore pierced through the metallic sheet;

continue to press the punch along said punching direction as the middle portion of the punch enters said bore until the concave profile of the expanded portion of the punch impresses an expanded entrance around said bore, the clearance between the middle portion of the punch and the die recess being sufficient such that said drawn material forms a rim around said bore, said rim being raised relative to a surrounding surface of the second side of the metallic sheet around said bore, and;

continue to press the punch along said punching direction until the axially extending step of the punch impresses a step around said expanded entrance, thereby axially recessing said expanded entrance relative to surface of the metallic sheet surrounding the bore;

withdrawing the punch from the bore;

repeating, if necessary, the above steps to create said plurality of bore in said metallic sheet, and then using said metallic sheet to provide said first wall in the vacuum plate with the first side of the metallic sheet providing the first side of the first wall, so that when said at least one air outlet is connected to a source of vacuum pressure, the first side of the first wall provides, in use, a vacuum surface for pulling and holding sheet material articles to the vacuum surface.

Preferably, the expanded portion has a concave profile that flares away from the bore axis, and the method comprises the step of pressing the punch along the punching direction until the concave profile of the expanded portion of the punch impresses a convexly expanded entrance around the bore.

Preferably, the rim is formed as a tubular ring of material around the bore, this ring of material extending in an axial direction away from a surrounding surface of the metallic sheet around the bore.

The vacuum plate may further comprise a second wall, the method comprising the steps of: spacing apart the first and second walls in a substantially parallel orientation; and providing the, or each, air outlet in the second wall.

The vacuum plate may further comprise a reinforcing structure spanning the first and second walls. The method may then comprise using an adhesive to affix the reinforcing structure to a second side of the first wall.

The reinforcing structure preferably comprises an array of cell walls and is, most preferably, a honeycomb structure having an array of hexagonal cell walls. In this case, the method comprises: affixing the reinforcing structure to a second side of the first wall by placing a first end of said cell walls on the surrounding surface of the second side of the first wall; and then, with the first end of said cell walls placed on the surrounding surface of the second side of the first wall, using the adhesive to affix the first end of the cell walls to the surrounding surface around the rims.

Preferably, the method comprises using an adhesive to affix a second end of the cell walls being to a first surface of the second wall.

The adhesive may be applied to the first end of the cell walls prior to placement of the first end of the cell walls on said surrounding surface.

The method may also comprise using at least one of the rims to provide a barrier against uncured adhesive flowing into a corresponding one of said holes, and then curing said adhesive.

BRIEF DESCRIPTION OF THE DRAWINGS

The invention will now be further described, by way of example only, and with reference to the accompanying drawings, in which.

DETAILED DESCRIPTION

Figure 1:
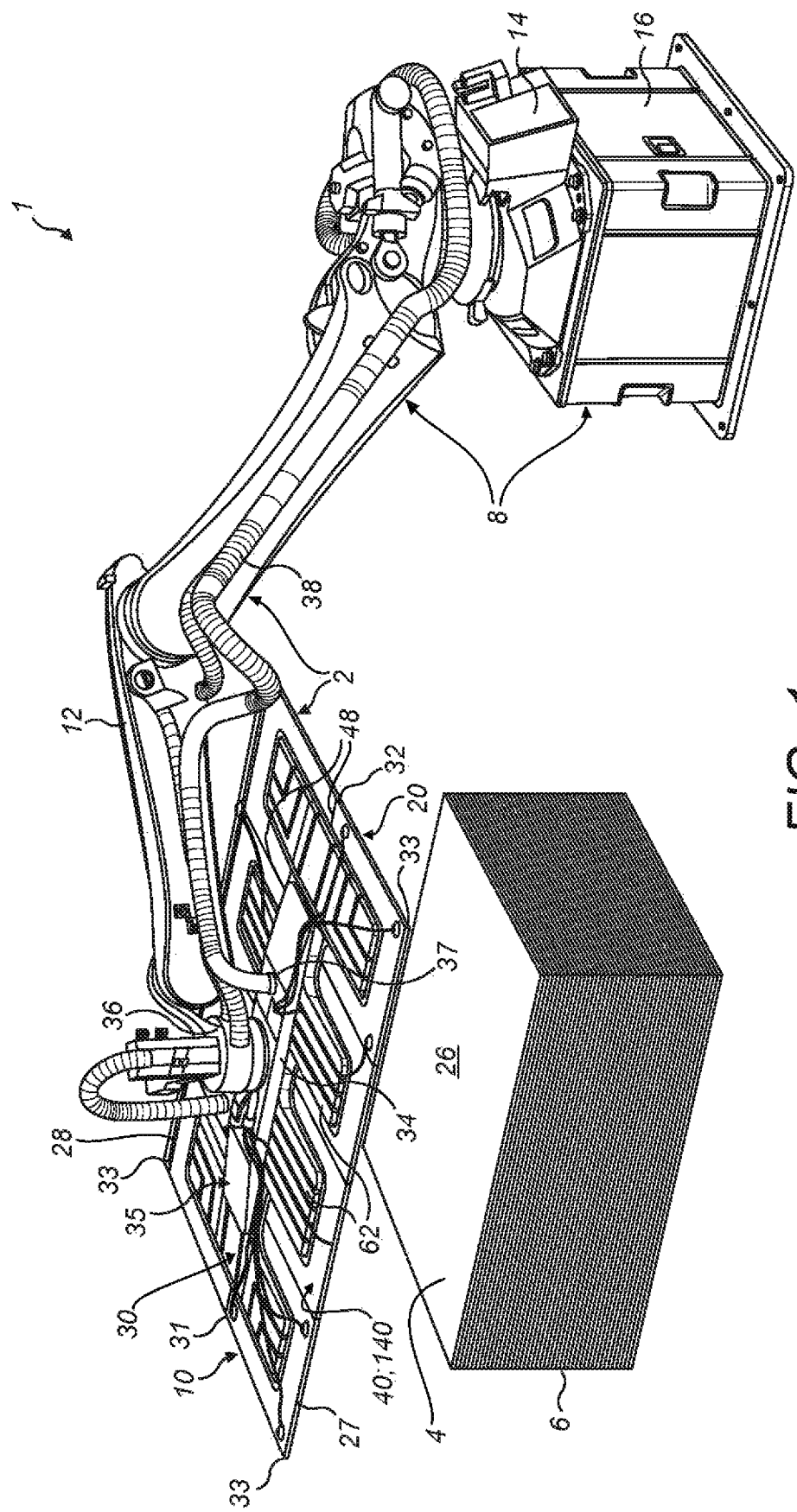
FIG. 1 shows a vacuum plate sheet material handling system comprising a substantially planar vacuum lifting plate according to a preferred embodiment of the invention, in the process of being used to lift and deposit sheet material articles, the vacuum lifting plate comprising a plurality of adjoining vacuum plate modules.

FIG. 1 shows a vacuum plate sheet material handling system 1 that comprises a sheet material handling apparatus 2 for lifting and depositing sheet material articles 4, for example cardboard sheets with dimensions 3.2 m×1.6 m. The sheet material handling apparatus 2 comprises a sheet material handling actuation system 8 and a substantially planar vacuum plate 10. The sheet material articles 4 are stacked in a stack 6 in proximity with the sheet material handling actuation system 8, which in this example includes a five-axis robotic arm 12 configured to raise, lower and move the vacuum plate 10, which in this example is a vacuum lifting plate, whilst keeping it level. As will be explained below, the vacuum plate 10 provides a downwardly oriented vacuum surface 20, which in this example is a vacuum lifting surface, to which each sheet material article 4 is sucked when a vacuum pressure is applied to the vacuum surface from a source of negative, or vacuum, air pressure 16. The source of vacuum pressure is usually at the higher end of what is termed "low vacuum", typically between about 0.1 and 0.5 of atmospheric pressure. For this reason, the terms "vacuum plate", "vacuum surface", "vacuum pressure", etc. are interchangeable with the terms "suction plate", suction surface", "suction pressure", etc.

The sheet material handling actuation system 8 also comprises a control system 14 configured to control the operation of the vacuum sheet handling apparatus 2 and sheet material handling actuation system 8.

The mechanical details of the robotic arm 12, and the general way in which it may be controlled by the control system 14 to move about five axes, are not central to the invention, and will also be familiar to those skilled in the art, and so will not be further described in detail.

In this example, the sheets 4 are lifted one at a time off the stack 6 by the vacuum plate 10 and then deposited elsewhere, for example at an automated sheet cutting table (not shown). After cutting, the vacuum plate 10 lifts and deposited the cut material at a desired location. The particular details of such a lifting and depositing process are not central to the invention, and will also be familiar to those skilled in the art, and so will not be further described in detail.

In use, a planar vacuum plate 10 is maintained in a substantially horizontal or level orientation while being moved forwards or backwards along orthogonal horizontal X- and Y-axes and upwards or downwards along a vertical Z-axis.

With reference now also to FIGS. 2-5, the vacuum plate 10 has on a first side 18, which in this example is a lower side, the substantially planar downwardly orientated vacuum surface 20. The vacuum surface is provided by a first wall 22, which in this example is a lower wall, perforated by an array of vacuum holes or orifices each of which is defined by a bore 24 extending through the first wall. The array of vacuum holes may be a square or rectangular array along both horizontal (X- and Y-) directions. The bores 24 are on centres typically spaced apart by between about 5 mm and 30 mm, and more typically about 15 mm. A typical vacuum planar vacuum surface may be about 1.6 m wide and 3.2 m long, although the size may be larger or smaller than this, depending on the application. At a typical bore spacing on a square grid of 15 mm by 15 mm, there may therefore be on the order of 40,000 vacuum holes across the full extent of the vacuum surface 20.

When a vacuum pressure is applied from behind the bores 24, air is sucked 100 into the holes and this provides a suction force to pull 29 the sheet material article 4 to be lifted onto the vacuum surface 20 of the vacuum plate.

As will be explained in detail below, the bores are connected to an airflow suction system for conveying vacuum air pressure to the perforated vacuum surface including the source of negative, or vacuum, air pressure 16 for attracting, making contact with and holding to the vacuum surface an upper surface 26 of an uppermost one of the sheet material articles 4. The operation of the sheet material handling actuation system 8, the robotic arm 12 and the source of vacuum pressure 16 is controlled by the control system 14. The control system may also be used to control airflow valves (not shown) in order to switch on an off and control the vacuum suction. The airflow valves may be conventional valves at any convenient point in the airflow path. Such valves will be familiar to those skilled in the art, and so the sake of conciseness, will not be further described.

The vacuum plate 10 is rectangular, with opposite first and second long edges 27, 28 and opposite first and second short edges 31, 32, and four corresponding corners or vertices 33 between adjacent long and short edges.

The vacuum plate 10 has on a second side 19, which in this example is an upper side, a substantially planar upwardly orientated mounting surface 21 provided by a second wall 23 of the vacuum plate, which in this example is an upper wall of the vacuum plate. The vacuum sheet material handling apparatus 2 also comprises a chassis 30 which provides mechanical support across the lateral extent of the of the vacuum plate 10. The chassis 30 is here an upper chassis affixed to the upwardly orientated mounting surface 21 of the vacuum plate 10.

The upper chassis is preferably moulded in a fibre-reinforced composite material, most preferably a carbon fibre composite. The vacuum plate 10 is therefore supported beneath the chassis 30.

The chassis 30 has in a central portion 34 an upwardly facing mounting bracket 35 to which a manipulating end 36 of the robotic arm 12 is connected. The chassis is also affixed substantially centrally with respect to the centre of gravity of the vacuum plate 10 The vacuum plate is therefore substantially balanced about its midpoints in both X- and Y-directions.

The chassis 30 has at least one air outlet 37 for connection to the source of negative air pressure 16, for example by a flexible hose 38 as shown in FIG. 1. The air outlet 37 conveys vacuum pressure to the vacuum plate 10 through a plurality of air channels 39 provided between the second wall 23 of the vacuum plate and an upper wall 41 of the chassis.

The vacuum plate 10 has a substantially hollow interior 49 bounded on opposite sides by the first and second walls 22, 23 of the vacuum plate 10. The air channels 39 communicate with the hollow interior through at least one air outlet or exit hole, and in this example an array of five air exit holes 25, in the second wall 23 of the vacuum plate 10. The hollow interior 49 therefore acts as a plenum chamber for a plurality of the suction or vacuum holes provided by the bores 24. In this way, vacuum pressure is conveyed to the bores 24 defining the array of holes in the first wall of the vacuum plate to provide vacuum pressure (i.e. suction pressure) from the downwardly oriented vacuum surface 20 to the upper surface 26 of the sheet material articles 6 to be lifted.

The vacuum surface 20 may be provided by a single, unbroken sheet, for example a metallic plate. However, in order to keep the weight of the vacuum plate as low as possible, and therefore reduce physical demands on the sheet material handling actuation system 8 and/or increase the acceleration and speed of actuation, it has been found advantageous to form the vacuum plate 10 from a plurality of laterally adjacent vacuum plate modules 40, which in this example are vacuum lifting plate modules. In this example, as shown most clearly in FIG. 1, the modules 40 are configured to be joined together as adjacent tiles. There are eight such modules: four along each long side edge 27, 28, and two along each short side edge 31, 32 of the vacuum plate.

Figure 2:
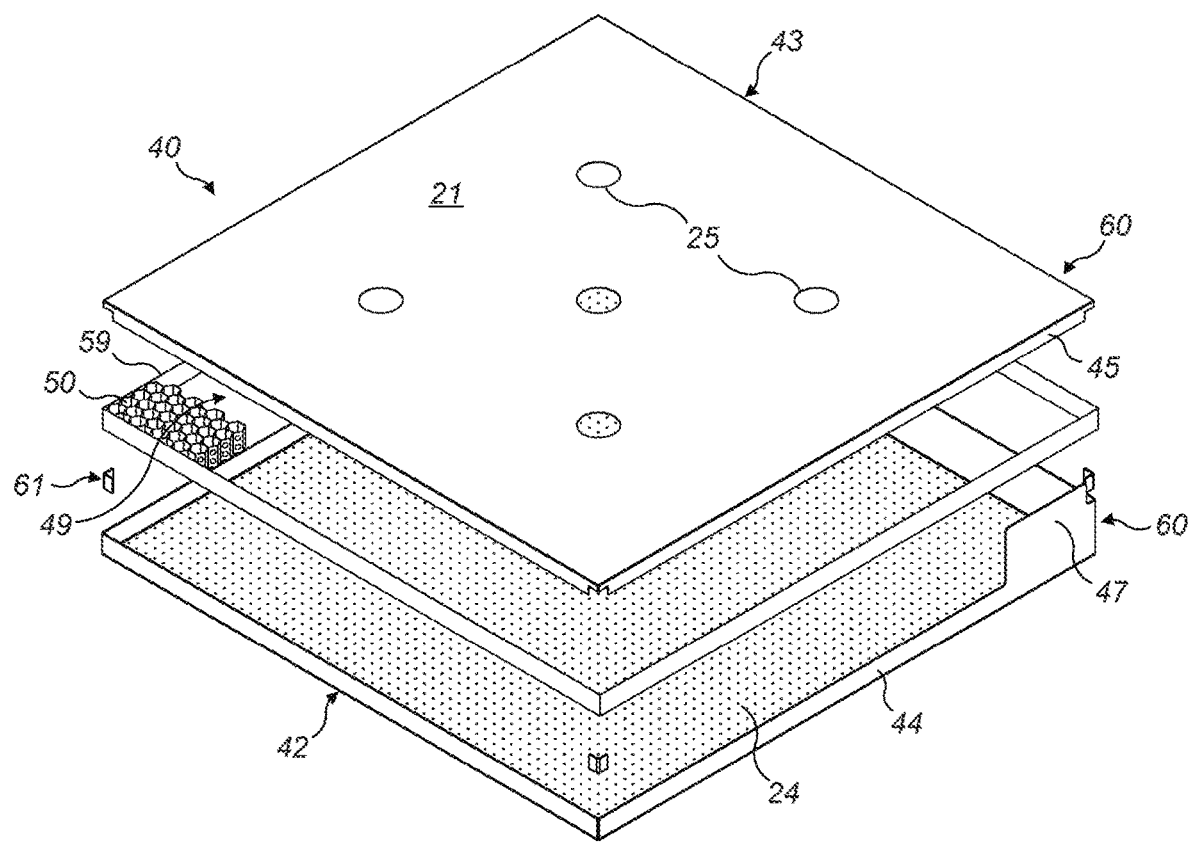
FIG. 2 is an exploded view of one of the vacuum plate modules of FIG. 1, showing reinforcing internal honeycomb matrix having hexagonal cell walls sandwiched within an outer housing.

These vacuum plate modules 40 are adapted to be fitted together into a whole and to the upper chassis 30. As shown in FIG. 2, each module has first and second clamshell plates 42, 43 which provide, respectively, the first and second walls 22, 23 of the vacuum plate. The first and second clamshell plates are each formed from folded sheet metal, preferably aluminium or an aluminium alloy, and have a rectangular or square outline with, respectively, first (lower) and second (upper) rims 44, 45 extending at right angles to the first and second walls. The second rim seats 45 inside the first rim 44.

When joined together, the first clamshell plates 42 therefore provide the first wall 22, and hence the vacuum surface 20, of the vacuum plate 10. Similarly, the second (upper) clamshell plates 43 therefore provide the second (upper) wall 23, and hence the upwardly oriented mounting surface 21 of the vacuum plate to which the chassis is affixed. The vacuum surface 20 is parallel with the upwardly oriented mounting surface 21. The first and second walls 22, 23 of the vacuum plate 10 are spaced apart around their respective peripheries by the interengaging first and second rims 44, 45. Although not illustrated, the rims are affixed to each other, either by mechanical means, such as rivets or, preferably, by adhesive 46.

The upper chassis 30 is affixed to the upwardly oriented mounting surface 21 of the vacuum plate, either by mechanical means, such as rivets (not shown) or, preferably, by adhesive 46.

Optionally, one or more of the vacuum plate modules 40, may be provided with upward extensions of the first rim 47, which project upwardly above the level of the mounting surface 21 from one or more seams 48 between adjacent vacuum plate modules 40 in each module. Such first rim extensions 47 may then engage with a matching feature of the chassis, for example a bracket or slot (not illustrated). Further details of such mounting arrangements between a vacuum plate module and an upper chassis, can be found in the patent applications published as WO 2019/030724 A1, WO/030728 A1 and WO 2019/030735 A1, the contents of which are hereby incorporated by reference.

Each vacuum plate module 40 is reinforced across its lateral extent by a reinforcing structure 50 that extends vertically between the first (lower) and second (upper) walls 22, 23 of the vacuum plate 10 within the hollow interior 49 of each module. The reinforcing structure may be a vertically oriented honeycomb reinforcing structure 50 which spans the interior of the module housing and which comprises contiguous hexagonal cells 51 having vertically extending cell walls 52 each of which is perforated by at least one transverse or lateral aperture or hole 53 to allow cross-flow of air within the reinforcing structure towards cells which are within the footprint of one or another of the array of air exit holes 25 in the second wall 23 of the vacuum plate 10. First (lower) and second (upper) ends 54, 55 of each cell wall 52, or at least a substantially complete proportion of the ends 54, 55 of the cell walls, are bonded by means of adhesive 56 to corresponding second (upper) and first (lower) inner sides or surfaces 57, 58 of the housing hollow interior 49 provided by, respectively, the first (lower) and second (upper) walls 22, 23 of the vacuum plate 10 in each vacuum plate module 40. During the bonding process, as the adhesive is cured, for example thermally, the first and second ends 54, 55 of the cell walls 52 ideally abut, respectively, the first and second inner surfaces 57, 58 of the first and second walls 22, 23 of the vacuum plate 10.

The second ends 55 of cell walls 52 in the vicinity of the array of air exit holes 25 in the second, upper wall 23 of the vacuum plate 10 need not be bonded, however, this does not significantly affect the strength of the reinforcement, given the relatively small surface area of these air exit holes as compared with that of the second wall of the vacuum plate.

Figure 5:
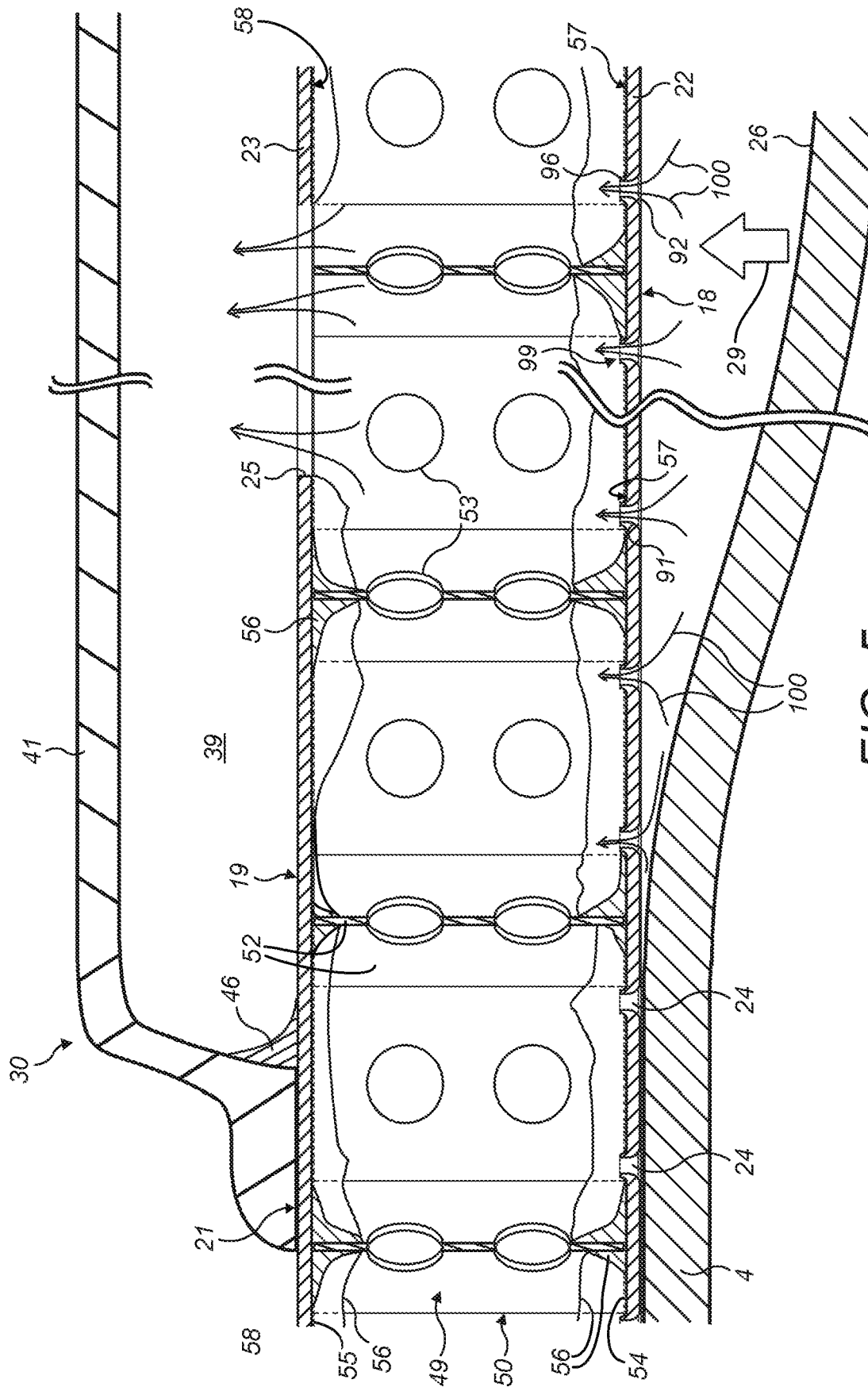
FIG. 5 is a schematic cross-section through the assembled module housing and reinforcing honeycomb matrix, taken along lone V-V of FIG. 4, showing how the holes are defined by bores that have internally raised rims which prevent adhesive within the module housing from blocking any of the bores.
Figure 6:
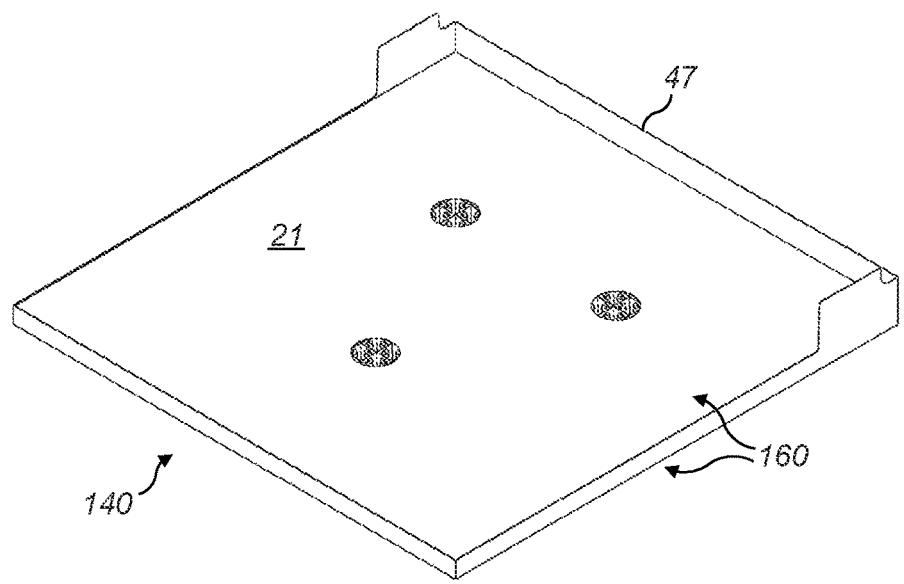
FIG. 6 is a perspective view of a second embodiment of a vacuum plate module for incorporation in the vacuum lifting plate of FIG. 1.
Figure 7:
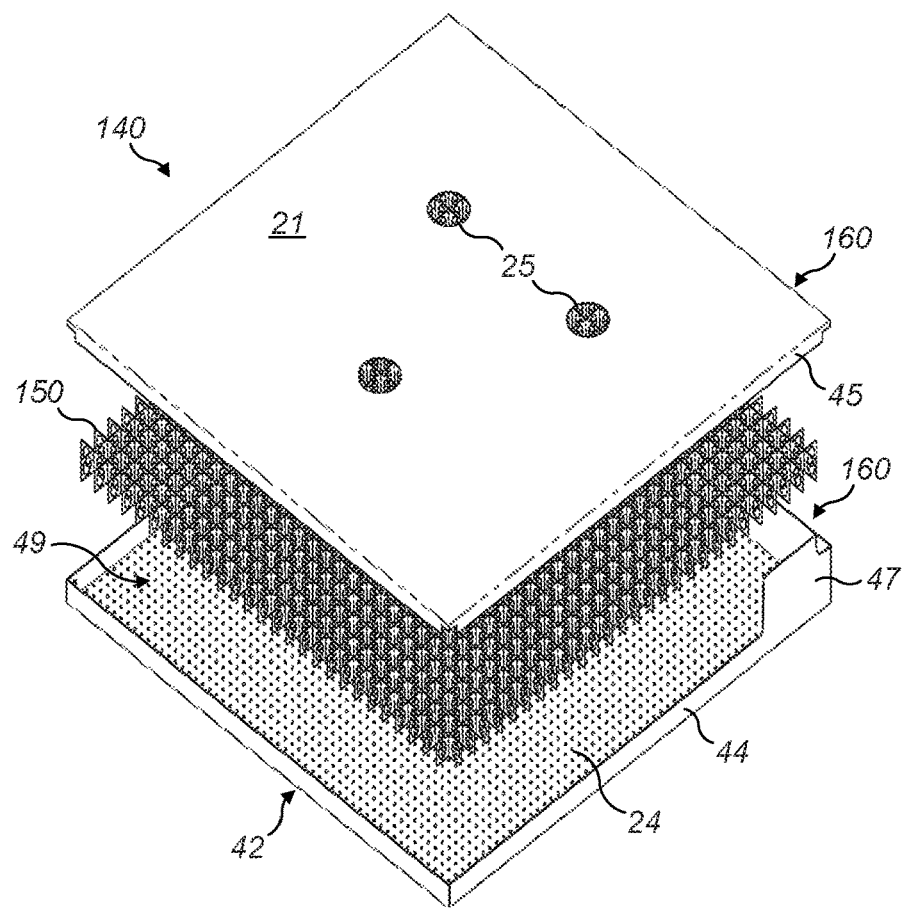
FIG. 7 is an exploded view of the vacuum plate module of FIG. 6, showing how an internal reinforcing structure is formed from a grid of interlaced linear walls.
Figure 8:
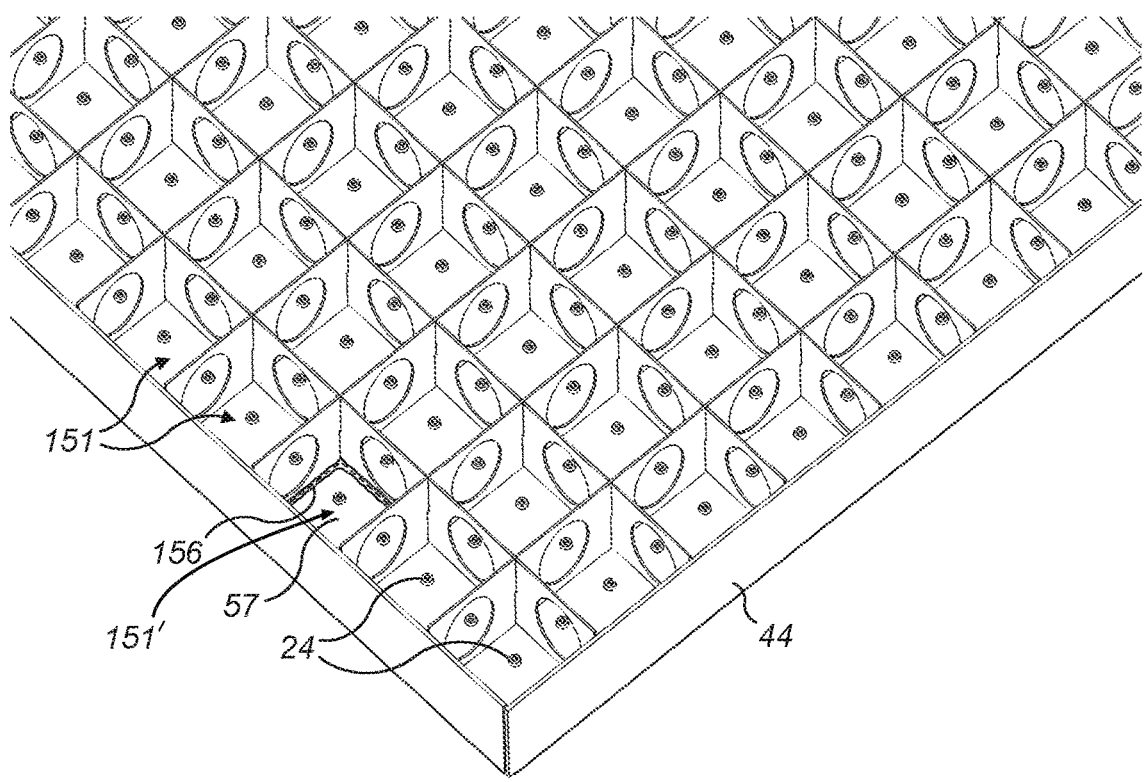
FIG. 8 is an enlarged perspective view of part of the vacuum plate module, showing the arrangement of bores in the lower wall of the vacuum plate with respect to the grid of walls.

The adhesive 56 bonding the honeycomb structure to the wall will, in general, be applied as a liquid adhesive before curing to set the adhesive, as shown in FIG. 5. This can be done by dipping one end of the honeycomb cell walls in an adhesive. The adhesive will lap most or all of the abutment between the honeycomb cell walls and adjacent first and second inner surfaces 57, 58 of the first and second walls 22, 23 of the vacuum plate 10.

Preferably, before bonding of the honeycomb reinforcing structure 50 inside the hollow interior 49, the cells are secured within an outer frame or band 59 which may extend continuously around the periphery of the cells, inside the rims 44, 45. Four L-shaped corner reinforcement tabs 61 may also be provided, which are preferably bonded to internal corners within the hollow interior 49, to provide additional strength and seal any air gaps between the first and second rims 44, 45.

The first and second clamshell plates 42, 43, the outer frame or band 59 and the corner tabs 61 together provide a vacuum plate module housing 60, a hollow interior of which is spanned vertically by the air-permeable reinforcing structure 50 to provide the vacuum plate module 40.

Figure 3:
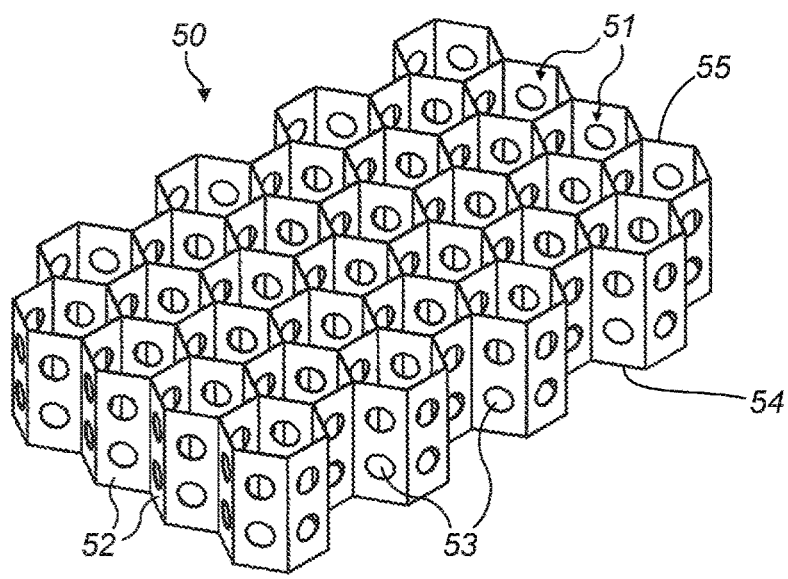
FIG. 3 is an expanded view of part of the honeycomb matrix of FIG. 2.

The reinforcing hexagonal cell structure is made from parallel metallic strips, preferably aluminium foil, for example 0.25 mm thick foil, bonded together along transverse lines and then, before pulling apart to form hexagons, punched through or drilled to form the apertures 53 for the cell walls. The strips are then pulled apart to form the cellular structure as shown in FIGS. 2 and 3. When bonded inside the hollow interior 49 of the vacuum plate module housing 60, this provides reinforcement against bending or twisting in the vertical direction, while adding little extra weight to the vacuum plate module. By keeping the weight down in this way, while maintaining sufficient rigidity, the size of the robotic arm and actuation system can be reduced while helping to increase the permissible acceleration in use.

Further reinforcement and weight reduction is provided by the way in which arch-like portions of the chassis (i.e. those parts providing each air channel 39 between the vacuum plate 10 and the upper chassis 30) span each vacuum plate module 40, whilst providing a manifold for the vacuum plate having branched ends or lobes 62, one for each vacuum plate module 40.

The suction panel modules 40 are formed predominantly from sheet metal, for example aluminium or, if additional strength is required, stainless steel. When assembled together, the vacuum plate 10 and upper chassis 30 provide truss-like reinforcement across the lateral extent of the assembled structure.

FIGS. 6 to 9 show a second embodiment of a vacuum plate module 140 which may be used in place of the first embodiment of vacuum plate module 40 in the vacuum lifting plate 10 of FIG. 1. In FIGS. 6-9, features which are the same as those of FIGS. 2-5 are indicated using the same reference numerals, and features which are analogous are indicated using reference numerals incremented by 100.

The vacuum plate module 140 uses the same type of first and second clamshell plates 42, 43 as described above to provide, respectively, the first and second walls 22, 23 of the vacuum plate 10. The first, lower wall may be the same as that described above, except that the grid spacing in the X- and Y-directions of the bores 24 may be varied to suit an internal reinforcing structure 150, which in this example is formed from a grid of vertically extending interlaced linear walls 152, and which provides reinforcement of the vacuum plate module housing 160 across its lateral extent.

The reinforcing structure 150 extends vertically between the first and second walls 22, 23 of the vacuum plate 10 within the hollow interior 49 of each module. The reinforcing structure is preferably a vertically oriented grid of interlaced linear walls 152 that form an array of contiguous square cells 151 having vertically extending cell walls 152 each of which is perforated by at least one transverse or lateral aperture or hole 153 to allow cross-flow of air within the reinforcing structure towards cells which are within the footprint of one or another of the air exit holes 25 in the second wall 23 of the vacuum plate 10. As in the first embodiment, the hollow interior 49 of the vacuum plate provides a plenum chamber. The first (lower) and second (upper) ends 154, 155 of each cell wall 152, or at least a substantially complete proportion of the cell walls, are bonded by means of an adhesive 156 to corresponding first (lower) and second (upper) inner sides or surfaces 57, 58 provided by the first (lower) and second (upper) walls 22, 23 of the vacuum plate 10 in each vacuum plate module 140. For the sake of clarity in FIG. 8, the lower end of the walls of just one cell 151' is shown bonded by the adhesive 156, but in practice every wall or substantially all walls of each cell would be bonded by adhesive to the inner sides or surfaces 57, 58 of the first and second walls 22, 23.

As in the first embodiment, the adhesive 156 bonding the reinforcing structure to the wall, in general, be applied as a liquid adhesive, for example by dipping one end of the honeycomb cell walls in an adhesive, and then curing the adhesive thermally.

The second embodiment of the reinforcing structure 150 is potentially stronger than the first embodiment, and so may not need the outer frame or band 59 around the periphery of the cells 151, inside the rims 44, 45, or corner reinforcement tabs 61. Air gaps at edges and corners may be sealed with cured adhesive which would also provide additional strength.

The first and second clamshell plates 42,43 provide a vacuum plate module housing 160, the hollow interior 49 of which is spanned vertically by the laterally air-permeable reinforcing structure 150.

Figure 9:
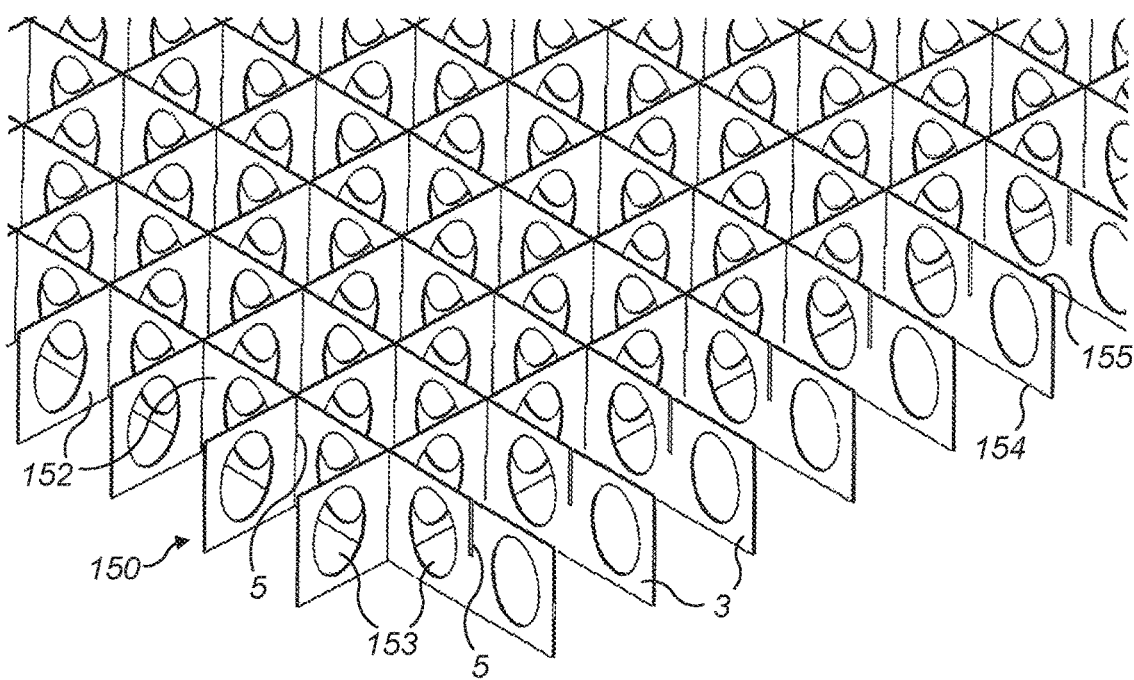
FIG. 9 is an enlarged perspective view of the interlaced walls, with one wall removed to show how these slot together.
Figure 10:
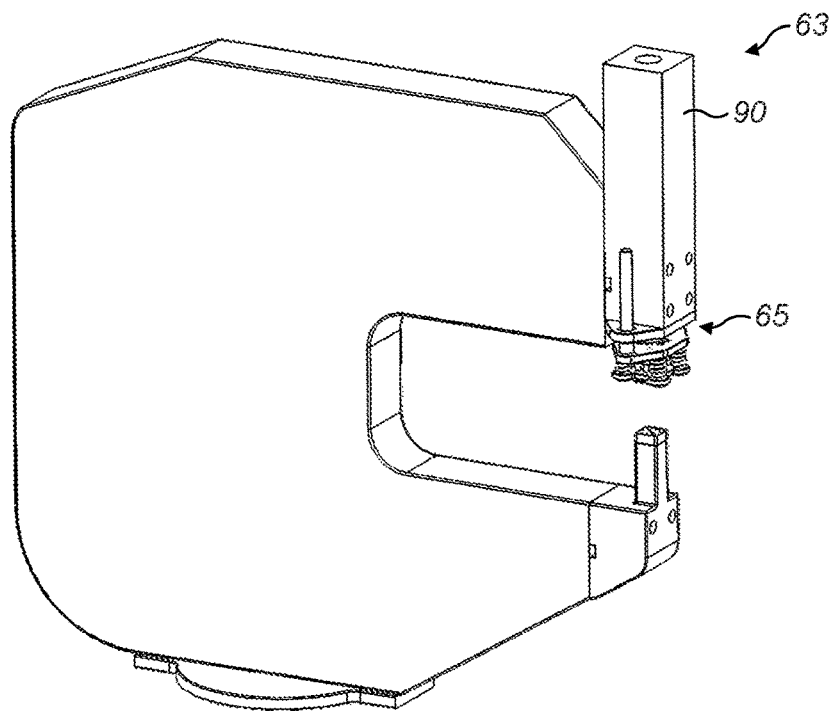
FIG. 10 is a perspective view of a punch and die press for forming the suction holes of a vacuum plate such as that of FIG. 2, showing a movable punch carriage in an open or retracted configuration in relation to a fixed die block.
Figure 11:
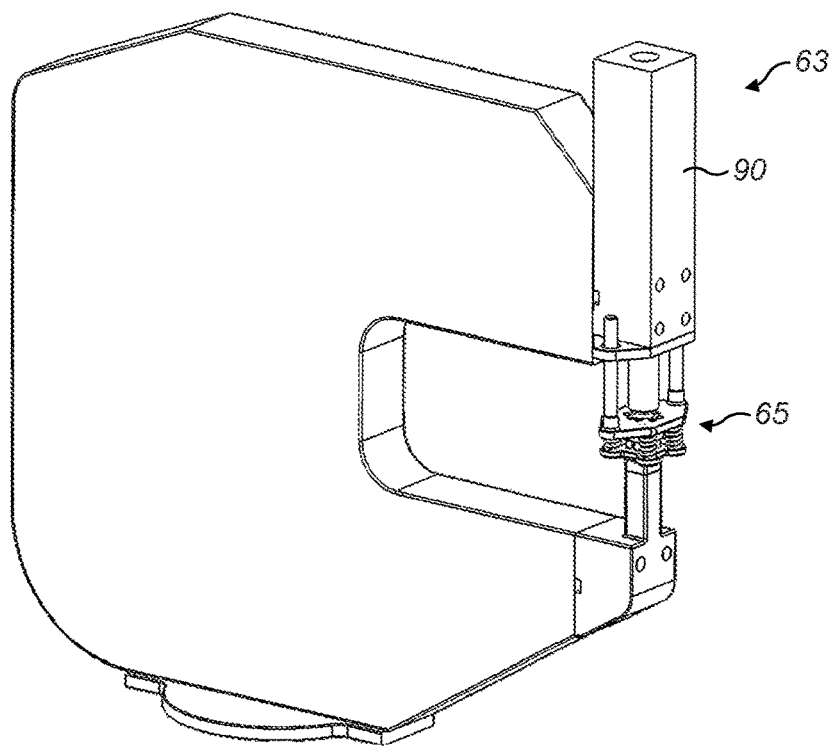
FIG. 11 is a perspective view of the punch and die press of FIG. 10, in a closed configuration when used to pierce bores in a metal sheet, which is omitted from the view.
Figure 12:
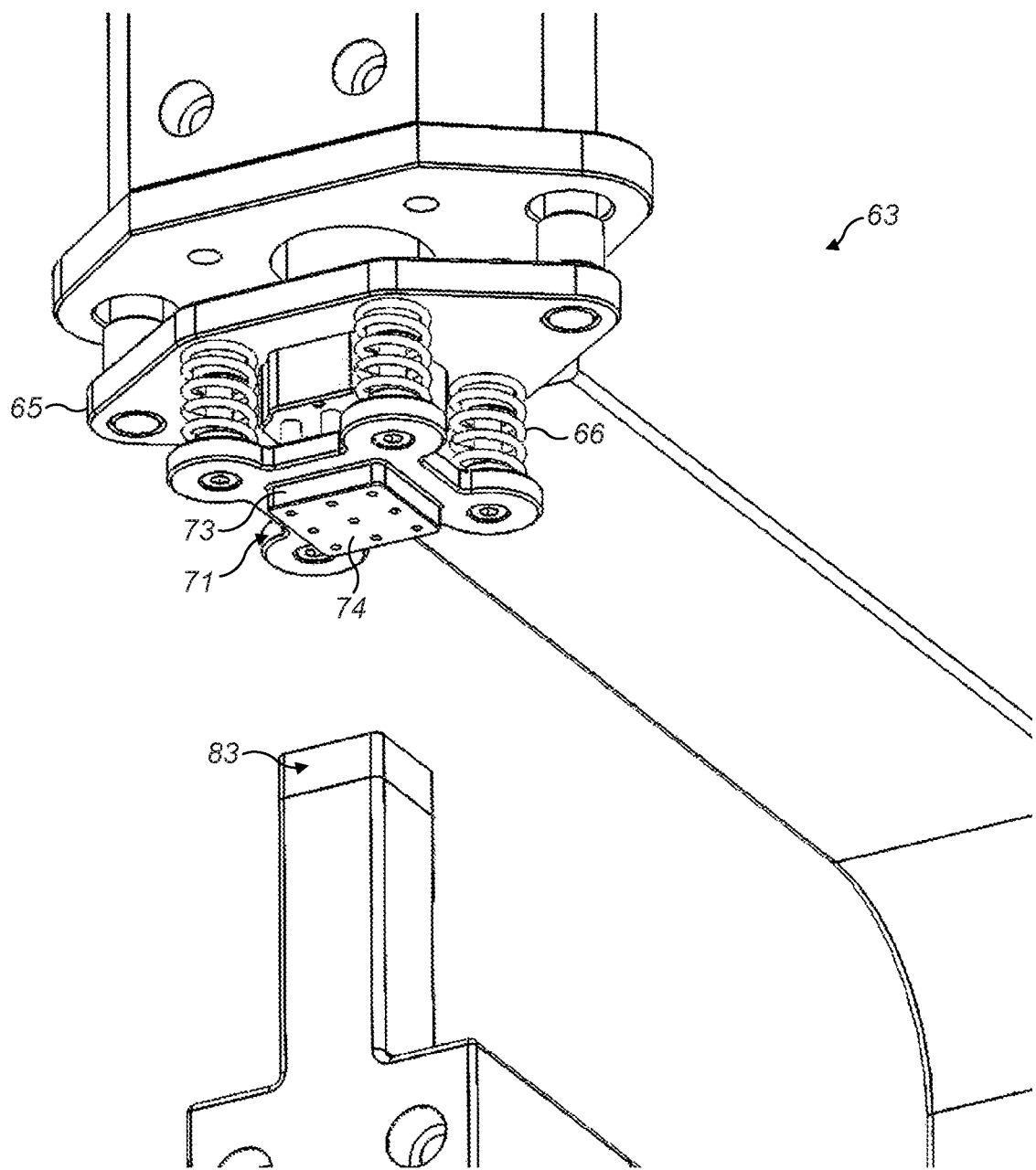
FIG. 12 is an enlarged perspective view of the punch and die press from below, showing how the punch carriage has nine punch bores in a punch face for nine corresponding punches.
Figure 13:
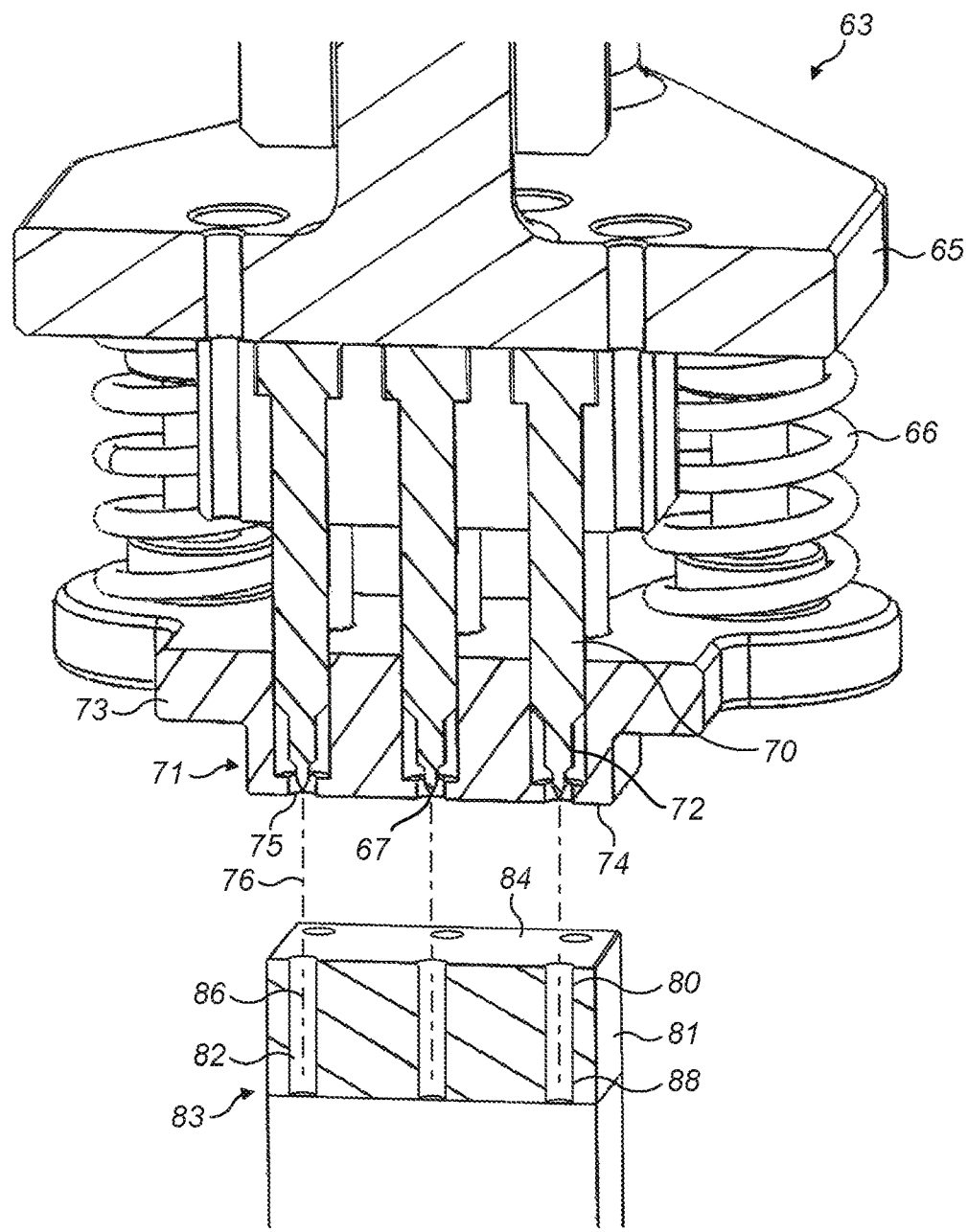
FIG. 13 is a cross-section through a punch block and die block of the punch and die press showing the cross-section profiles of the punches and die recesses.
Figure 14:
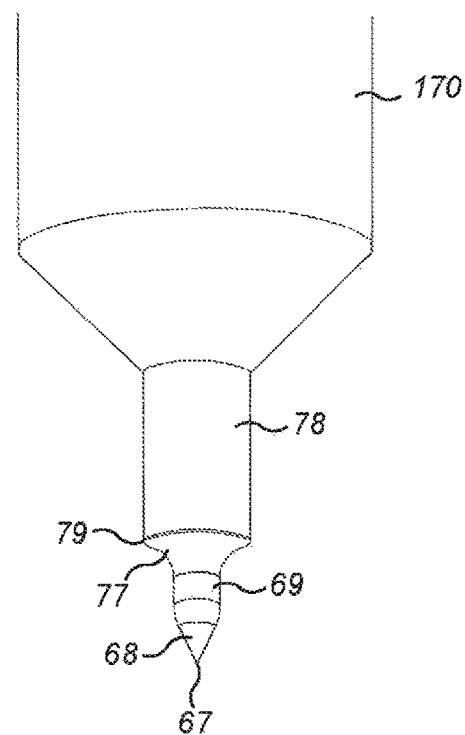
FIGS. 14 is a perspective view of one punch, showing how the outer profile has a V-shaped tip portion, a substantially cylindrical middle portion, and a concave expanded portion that terminates at a step with a stem portion.
Figure 15:
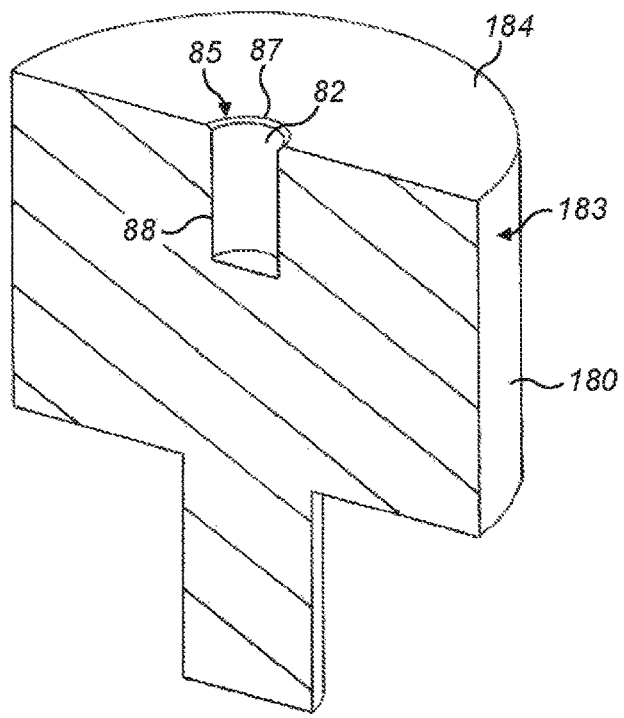
FIG. 15 is a cross-section through a die block similar to those of FIGS. 10 to 13, but having just one die recess, the recess having a cylindrical bore with a chamfered or rounded entrance.

The reinforcing square cell structure is made from two orthogonal sets of elongate parallel metallic strips 3, preferably aluminium sheet 1 mm thick that provide the square cells 151. The sets of strips intersect to provide the four walls 152 for each cell 151. The individual strips 3 of both sets are the same. The strips 3 have a length that spans the width or length of the hollow interior 49 of the vacuum plate module housing 160. Each strip has along its length spaced slots 5 that extend transversely across the width of each strip from one edge, the length of each of the slots being just over half the width of the strip. The width of each slot 5 is such each slot holds another strip extending at right angles, and the spacing of the slots is such that the slots of intersecting strips interleave with each other with the long edges aligned in parallel planes at lower and upper ends of the square cell walls. In FIG. 9, one of the walls 152 is omitted so that the slots 5 for receiving one strip can be seen fully.

The slots 5 are each formed by cutting a stack (not shown) of parallel strips with a saw. The strips are then placed in two jigs (not shown), each jig holding the strips in the correct parallel orientation and spacing. The jigs are then brought together to interengage all the slots at the same time. Optionally, the interengaging slots may be bonded together with adhesive to increase the strength of the reinforcing structure. When bonded inside the hollow interior 49 of the vacuum plate module housing 160, this reinforcing structure provides reinforcement against bending or twisting in the vertical direction, while adding little extra weight to the vacuum plate module.

Another advantage of this arrangement is that the slot spacing can be equal to the reinforcing wall height, as illustrated, so that a single round transversely or laterally extending hole 153 can be formed in the wall midway between each slot. These transverse or lateral holes 153 are formed by drilling through the strips when these are held parallel together in a stack of strips.

A further advantage of this arrangement is that the reinforcing grid 150 can be aligned with the axes of the array of holes defined by the bores 24, and the bore spacing can be the same along both axes while still avoiding overlap of the suction holes with the grid.

Figure 4:
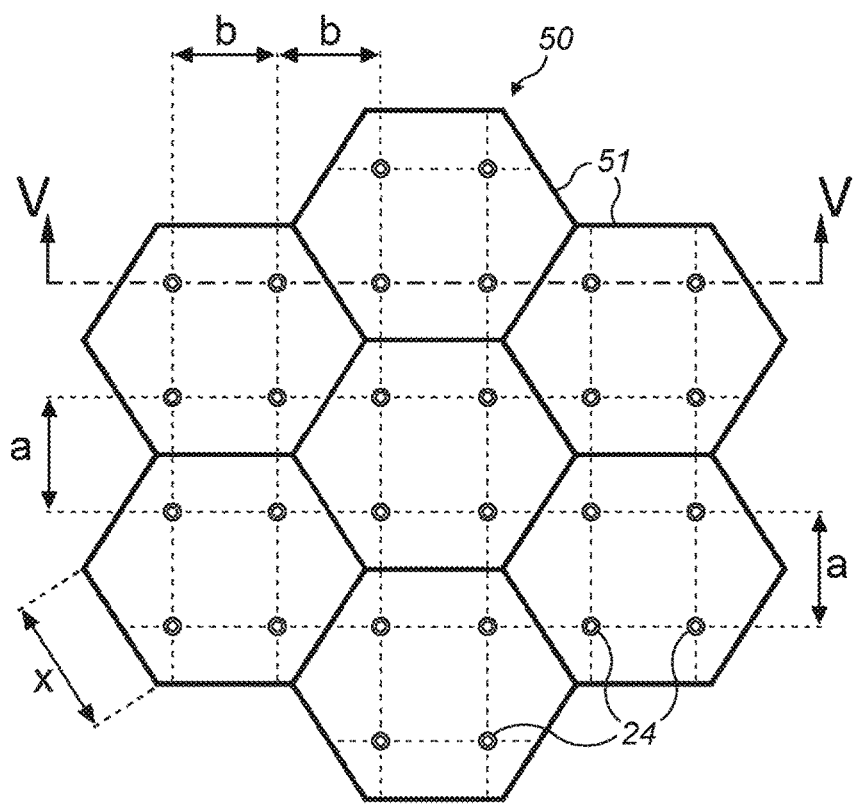
FIG. 4 is a schematic plan view within the assembled housing of FIG. 3, shows how a rectangular array of vacuum plate suction holes can be arranged with respect to the hexagonal cell walls in a repeating pattern.

As shown in FIGS. 4 and 5, each of the bores 24 in the first wall 22 of the vacuum plate 10 has a downwardly opening funnel profile in cross-section. The funnel profile preferably has a circular symmetry about a vertical axis through each bore. A method of manufacturing the bores is illustrated in FIGS. 6 to 15, which also show the shape of the funnel profile in more detail.

Reference is now made to FIGS. 10 to 13, which show one embodiment of a punch and die press 63 having nine punches 70 and dies 80, for use in forming bores 24 that define the array of suction holes in the vacuum plate 10. FIGS. 14 to 19 illustrate in simplified form and in greater detail the components and operation of a punch and die press 163 having a single punch 170 and single die 180. Features of FIGS. 14 to 19 which are the same as those of FIGS. 10 to 13 are indicated using the same reference numerals, and features of FIGS. 14 to 19 which are similar to those of FIGS. 10 to 13 are indicated using reference numerals incremented by 100. In both examples, punch 70, 170 and die 80, 180 have full rotational symmetry about common axes.

The bores are formed in an initially plain sheet of metal 64, either one at a time, or preferably more than one at a time, by pressing together the punch 70, 170 and die 80, 180 to pierce bores in the sheet metal. The bores are pierced and drawn, rather than punched, so that essentially no material of the sheet is lost during the process. After the bores are formed, the metal sheet is formed by folding the punched metal sheet to form the first wall 22 of the vacuum plate 10.

The punch acts on a first surface 7 of the plain sheet of metal 64 that will become the outside or lower vacuum surface 20 of the first wall 22 of the vacuum plate 10. The die is opposed to the punch and bears on a second surface 9 of the plain sheet of metal 64 opposite to the first surface 7 on what will become the inside or the first inner surface 57 provided by the first wall 22 of the vacuum plate 10, to be bonded to the internal honeycomb matrix 50. Preferably, as shown in FIGS. 10 to 13, more than one punch 70 is grouped in a punch holder or punch matrix 71 and more than one die 80 is grouped in a matching die holder or die matrix 81 so that multiple bores may be punched at once.

The punch 70, 170 is seated within a punch bore 72 through a punch stripper block 73, 173, the punch bore being surrounded by a first anvil surface 74, 174 of the punch stripper block. The punch bore has a cylindrical opening 75, and extends along a punch axis 76 that extends perpendicularly to the anvil surface of the punch stripper 73, 173. The punch bore provides a punch guidance sleeve. The punch stripper 73, 173 supports a tip 67 of the punch as it penetrates the metallic material. Supporting the punch tip at the point where maximum forces are being applied to the punch tip 67 ensures that it enters the centre of the die 80, 180, thus maintaining the correct die clearance.

The die 80, 180 has a recess 82 in a die block 83, 183, the recess being surrounded by a second anvil surface 84, 184. The recess is substantially cylindrical apart from a funnel-like opening 85 that flares outwards with a quarter-circle profile. The recess extends along a die axis 86 that extends perpendicularly to the second anvil surface 84, 184.

Figure 16:
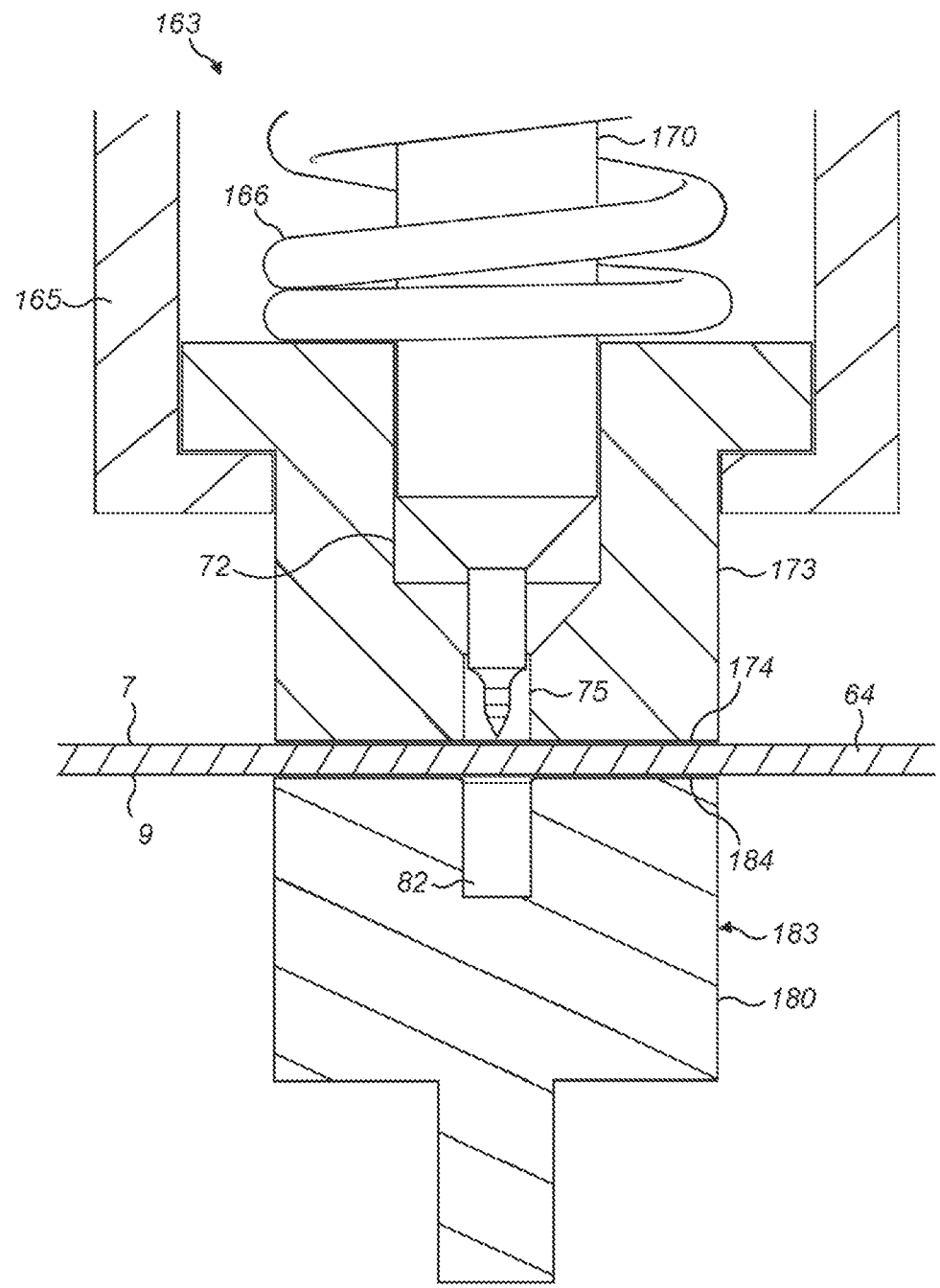
FIG. 16 shows how one of the punches is aligned with a single one of the dies, immediately prior to using the punch and die press to pierce a bore in the metal sheet.
Figure 17:
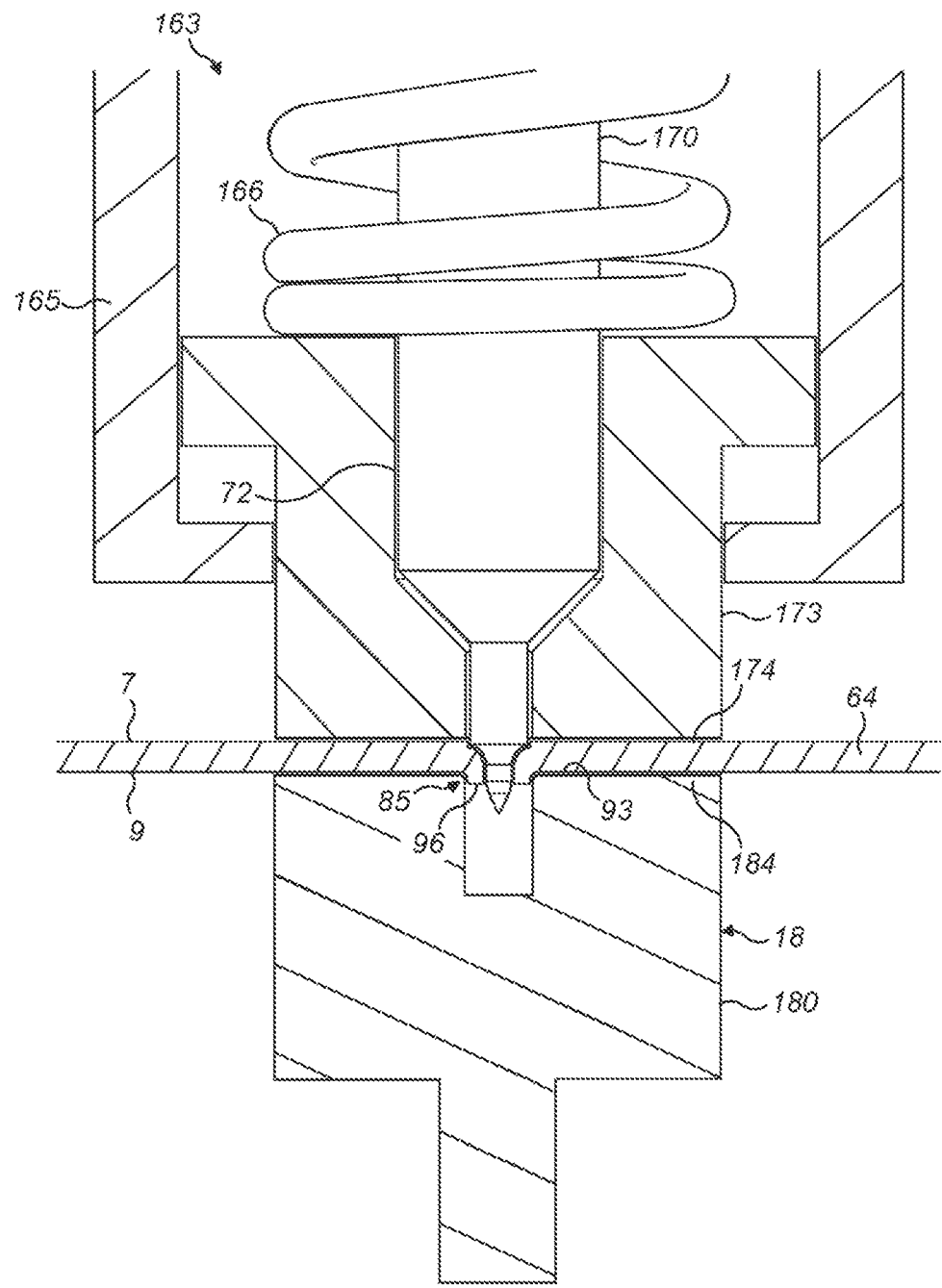
FIG. 17 shows how the different portions of the punch pierce a bore and then draw metal into the die recess to form a bore with a recessed bell opening and a drawn tubular extension of the bore extending beyond the surrounding surface of the metal sheet.
Figure 18:
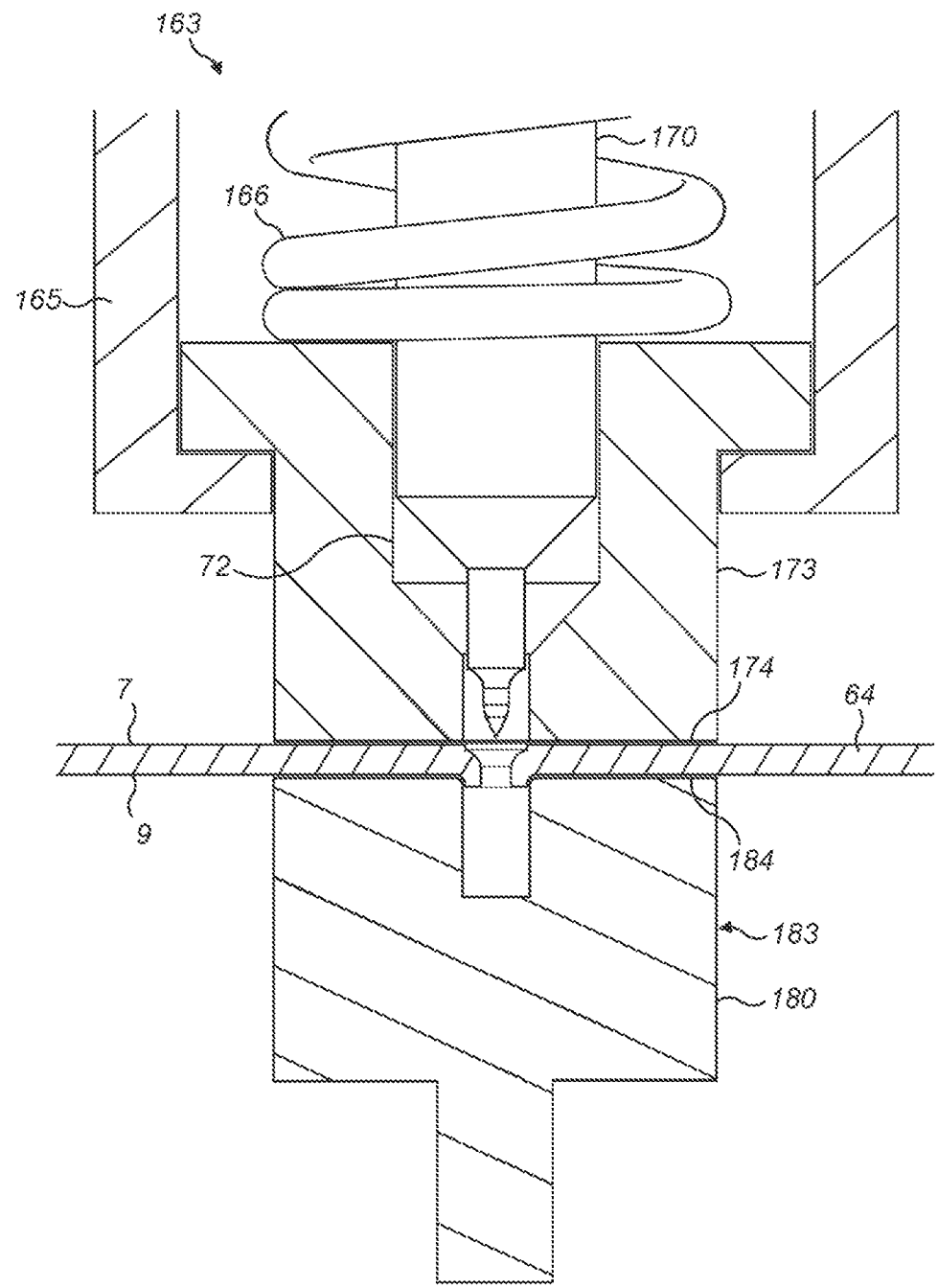
FIG. 18 shows the punch and die press of FIGS. 16 and 17, after withdrawal and separation of the punch from the die.
Figure 19:
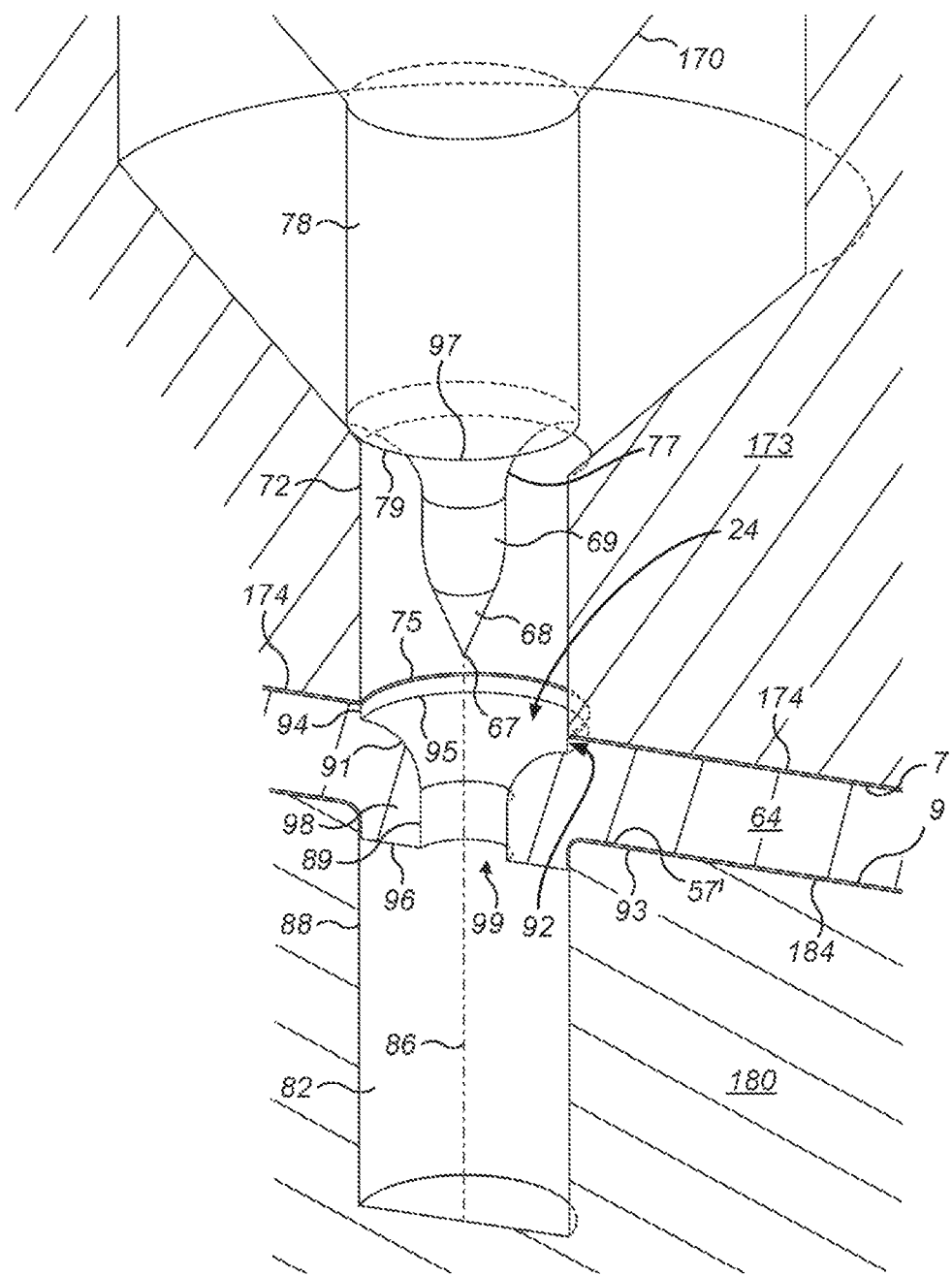
FIG. 19 is an enlarged perspective cross-section view of the withdrawn punch and die, showing the internal shape of the pierced and drawn bore in the metal sheet.

Prior to punching the bores 24, the sheet of metal 64 is placed between the first and second anvil surfaces 74, 174, 84, 184. The press 63, 163 is then used press the punch stripper block 73, 173 and die block 83, 183 together so that the sheet metal 64 is clamped between the first and second anvil surfaces, and then to drive the punch 70, 170, which is movable along the punch axis 76, into the die. During this process, the punch moves along the punch axis 76 between a retracted orientation, as shown in FIG. 16, in which the tip 67 of the punch is initially recessed within the punch bore 72, to an extended orientation, as shown in FIG. 17, in which the tip penetrates the sheet metal 64.

The punch tip 67 is initially surrounded by the punch bore 72, which therefore provides a punch sleeve. The internal surfaces of the punch sleeve permit axial movement of the punch tip between a recessed position, in which the punch tip 67 is fully recessed inside the cylindrical punch bore opening 75, and an extended position, in which the punch tip extends out from the punch bore opening far enough to fully form a punched bore through the sheet metal 64.

The cylindrical punch bore opening 75 is surrounded by the bore anvil surface 74, 174, which provides a flat punch face, and the die opening 85 is surrounded by the die anvil 84, 184, which provides a flat die face. The metal surfaces 7, 9 on opposite sides of the metal plate 64 surrounding the bore to be punched are held tightly between these two anvil faces during a punching operation when the punch 70, 170 pierces the metallic sheet to make the bore and a subsequent stripping operation, in which the punch is pulled back out of the bore.

The punch 70, 170 is held within a punch carriage 65, 165. The punch carriage is driven by a ram 90. Preferably, one or more springs 66, 166 are compressed during the extension of the punch tip 67. The springs act between the punch carriage 65, 165 and the punch stripper block 73, 173, so that the punch tip 67 is automatically withdrawn after the press 63, 163 relieves pressure on the punch. The clamping pressure on the punch stripper block 73, 173 and the die block 83, 183 is then also released, following which the sheet metal 64 is repositioned for the next bores 24 to be punched.

The punch tip 67 is sharp, and is provided at the end of a conical tip portion 68 of the punch 70, 170. The conical tip portion 68 of the punch tapers away from the punch tip towards a middle portion 69 that has a constant or substantially constant diameter. In this example, the middle portion is cylindrical in shape. Beyond this, the punch has an expanded portion 77 that tapers outwards such that the surface of the punch in this expanded portion has a funnel-like or concave surface profile, in planes passing through the axis 76 of the punch, which is aligned with the punch axis 76.

The expanded portion 77 of the punch terminates at a stem portion 78 of the punch having a constant or substantially constant expanded diameter, for example a second a cylindrical portion.

A substantially right-angle step 79 is provided between the expanded portion 77 and the stem portion 78 of the punch 70, 170.

The die recess 82 has a perimeter 87 having a shape/diameter that is substantially the same as, or slightly larger than the shape/diameter of the stem portion 78 of the punch, which has a constant or substantially constant diameter.

The opening 85 of the die recess 82, within the die perimeter 87 of the die recess, has a chamfer or radius to accommodate laterally outwards lateral flow of the punched metal on the first inner surface 57 of the first plate 22.

In the attached drawings, the die and punch have a circular symmetry about aligned axes 76, 86 of both the punch 70, 170 and die 80, 180. Although not illustrated, the dies and punches could, however, have non-circular symmetry. For example, these could both have aligned hexagonal symmetry about common axes extending along the punch direction.

The punch 70, 170, therefore has four sections which perform the following functions:

1. The sharp punch tip 67 and conical tip portion 68 provide a V-shear of the metal about a centre point. This starts the creation of the bore 24 and causes the metal material around the forming bore to flow both in an axial direction towards the die recess 82 and radially outwards towards a peripheral wall 88 of the die, where this meets the surrounding die anvil or die face 84, 184.
2. The middle portion 69 has an outer surface with a constant or substantially constant diameter such that the distance between this surface and the peripheral wall 88 of the die is somewhat less than the initial sheet thickness. This provides space so that the metal around the forming bore is stretched or drawn inwards in the axial direction further into the die recess 82, rather than being punched or sheared away from the surrounding main body of the metallic sheet 64. The middle portion 69 also creates a smooth main portion 89 of the punched bore 24, this main portion having a substantially constant diameter. However, the main purpose of the middle portion is to ensure that material drawn into the die recess forms a tubular ring 98 of material around the pierced bore of the suction hole that extends away from a part of the surrounding inner second surface 57' of the first wall of the vacuum plate around the bore 24.
3. The expanded portion 77 of the punch having a concave profile provides a convex V-shear of the metal around the outside of the main part of the bore 89 of the punched bore 24. This creates an outwards funnel surface 91 at the entrance to the main portion 89 of the bore 24 in the metal sheet, having a corresponding convex curve that expands radially outwardly from the main, substantially cylindrical part 89 of the bore of the suction hole (which may have a slight conical taper to facilitate withdrawal of the punch) Therefore, the surface of the punched bore 24 expands outwards progressively with a bell shape to terminate at the vacuum surface 20 of the vacuum plate 10, for example like a trumpet bell. As shown in FIG. 5, the funnel surface therefore provides a flared entrance 91 to airflow 100 into a cylindrical main portion 89 of the bore 24. In this example, the entrance 91 is bell-shaped, owing to the circular symmetry of the punched bore 24 about an axis of the bore. Opposite this entrance 91, the bore 89 of the bore 24 has an exit 99 for the air 100 pulled through the bore, this exit being surrounded by a lip or rim 96 that extends above the surrounding first surface 57 of the first wall 22 of the vacuum plate 10. A particular advantage of the rims 96 is that these help to prevent flow of the adhesive 56 into the bores 24 prior to curing of the adhesive.
4. The increased suction area afforded by the bell-shaped entrances 91 to the suction holes defined by the bores 24 increases the suction lifting force applied to the lifted sheet material article 4 for the provided suction air pressure. The smooth internal surfaces of the bores when produced by punching, as opposed to drilling, increases the air flow velocity and results in more efficient generation of suction lifting pressure.
5. The stem portion 78 of the punch having a constant or substantially constant diameter provides an outer shoulder of the punch 97 where this meets the concave expanded portion of the punch. The shoulder 97 is pressed sufficiently into the metal in order to stamp an imprint of this shoulder into the metal. The stem portion 78 therefore creates a stepped recess 92, where the bore 24 meets a surrounding planar surface 93 of the sheet metal 64. This stepped recess has substantially cylindrical wall 94 that terminates at a substantially right-angled transition 95 at the base of the stepped recess, where the substantially cylindrical wall 94 meets the outwards funnel surface (i.e. the outwardly flared surface 91) at the entrance to the cylindrical main portion 89 of the bore 24. The outwardly flared surface 91 and the substantially cylindrical wall 94 of the stepped recess 92 provide a flared entrance to the bore 24 which terminates at the surrounding planar surface 93 of the sheet metal 64.

The advantage of this is that the convex outer portion 91 of the punched bore 24 is fully recessed, so that suction pressure extends fully across the enlarged diameter of the opening to the bore provided by the substantially cylindrical wall 94 of the stepped recess 92. Once the sheet material article 4 is sucked up against the vacuum plate 10 to cover over the bore 24, the full vacuum pressure is applied over a correspondingly greater surface area, resulting in an increased suction force.

The stepped recess 92 need not be significantly deep to provide this effect, as compared with the thickness of the sheet metal 64, and is preferably between about 10% and 20% of the thickness. Preferably, the diameter of the stepped recess is at least twice the diameter of the main, cylindrical part or bore 89 of the bore 24, and more preferably between about twice and three times this diameter. The advantage of this is that there is a relatively shallow step to the recess, as compared with both the main bore diameter and the radial extent of the outwards funnel surface at the entrance to the main bore 89 of the hole. This helps to keep the airflow 100 laminar and not turbulent as air is sucked into the bore 24, thereby decreasing drag and maximising suction on sheet material articles 4 being drawn towards the suction holes provided by the bores 24.

This process, and the properties of the punched bores 24, provide numerous significant advantages over the individual drilling of holes.

A punching operation is inherently much faster (the order of 1 s) than a drilling operation. Also, frames can be used hold numerous punches together and numerous dies together. It is therefore possible, for example, to punch twenty bores at once, and then move to an adjacent location and punch the next twenty bores. The vacuum plate module 40 illustrated above has 3136 holes. Using a punch and die tool that forms twenty bores at once with suitable machinery for holding and positioning the plate, it would therefore be possible to complete the formation of bores within about 6 minutes, allowing also 1 s for movement and re-clamping of the plate at a series of locations across the full surface of the plate.

A punch and die press has to exert a pressure of about 0.25 tonnes for each bores that is pierced and drawn, this pressure being divided between the clamping force on the sheet and the pressure applied between the punch and die. It would be feasible to use a punch and die matrix having all 3136 punches and dies. The press would then need to exert a pressure of 780 tonnes, however this is well within the capabilities of presses. In this case, it would be possible to form all 3136 bores in the vacuum plate module in a process lasting 1 second.

Drills require constant liquid lubrication during drilling, and deteriorate steadily until having to be replaced after 1000 drilled holes. Punches and dies have effective lifetimes of the order of 200,000 punches, so effectively no time is lost changing punches and dies as compared with the use of drills. Forming suction holes using a punch and die is also a clean process, requiring no cooling liquid as is usual with drilling. There is therefore no requirement for de-greasing or cleaning prior to applying the adhesive to join the internal reinforcement to the inner surfaces of the vacuum plate housing, or along seams of the vacuum plate modules.

The invention therefore improves the speed and convenience of manufacturing a vacuum plate, whether a vacuum lifting plate, a vacuum hold-down plate or any other type of plate in which suction pressure is applied through bores in the plate to a sheet material article in order to pull the article to the vacuum surface of the vacuum plate.

Furthermore, the internal surface quality the suction holes is greatly improved. The surface finish of a punched bore is essentially limited only by the finish of the die tip, which is polished and may optionally be plated in an extremely hard material, for example TiN. This has major benefits in the operation of the vacuum plate, because it helps to maintain smooth laminar airflow through the bore, thereby conveying maximum suction pressure to an article to be lifted.

Once an article is pulled by suction to the vacuum plate, the recessed bell-shaped funnel acts like a little suction cup. Once airflow is blocked by the article adhered to the vacuum plate, the full vacuum pressure is applied over the whole area of the recess 92 around the flared portion 91 of the bore 24. The effective pulling force is increased owing to the greater surface area of the opening to the bore. Different shaped (non-circular) recesses, e.g. hexagonal, could alternatively be formed, in order to further increase the area over which vacuum pressure is applied.

As a result, the vacuum plate is relatively economical to manufacture, and the lifting force or hold-down force is increased, and/or the size, weight and power consumption of the vacuum supply may be reduced while providing the same suction pulling force.

A particular advantage of the metal punching process described above, is that it naturally creates the raised lip or rim 96 around the inside of the punched bore 24. This provides a solution to a manufacturing problem when bonding the honeycomb cell matrix to opposite internal surfaces of the first and second walls of the vacuum plate. As mentioned above, one convenient way this may be done is to apply an adhesive to the end portions of the walls (e.g. with a brush or by dipping) and then, while the adhesive is still wet, bring this up against the inside surface of the first wall of the vacuum plate, which has already been formed with the vacuum holes. The honeycomb cell walls are ideally spaced so that these do not cover over any of the pre-formed holes.

Preferably, the rectangular array of suction holes defined by the bores 24 is made to fit regularly within the repeating honeycomb pattern of the reinforcing structure, in order to avoid a situation where some of the bores are beneath the cell walls or so close that the adhesive blocks some suction holes.

As shown in FIG. 4, a rectangular array of bores can be made to fit regularly within a repeating honeycomb pattern when one of the array axes is perpendicular with two of the six hexagonal walls. If x is the hexagonal cell wall length, then the array repeats in the perpendicular direction at by $$a = x \cdot (\sqrt{3})/2$$

and in the parallel direction, the array repeats by $$3 \cdot x/2$$

In practice, the hexagonal shape of the cells may not be as regular as shown in the drawings, mainly because the cell walls are relatively thin and flexible. By optimizing the separation between the bores and the cell walls as described above, it is easier to match a grid spacing within a repeating hexagonal pattern, when the hexagonal shape of the cell walls is not be perfectly regular.

As can be appreciated from this, there is little room for error in keeping a sufficient separation between the cell walls and bores in the wall of the vacuum plate. It has been found in practice that if the bores do not have an associated raised inner rim, which is the case when holes are drilled with a drill bit, then excess adhesive sometimes migrates to block nearby drilled holes before there is time for the adhesive to set or cure. With no raised rim, there is also no way to prevent a cell wall extending over and blocking a suction hole, which can happen, given that the hexagonal array of the reinforcement structure is not, in practice, perfectly regular.

An advantage of the square matrix reinforcement shown in FIGS. 6-9 is that the walls 152 of the square cells 151 are thicker than those of the expanded honeycomb matrix. These walls can therefore be spaced further apart and be formed with larger transverse holes 153 to improve lateral airflow within the hollow interior 49 of the vacuum plate module housing 160. This arrangement also increases the separation of the air holes defined by the bores 24 from the walls 152, and permits the bores 24 to be formed on a square grid.

Although not illustrated, a further advantage in the second embodiment of reinforcing structure is that one or more of the strips 3 can be formed no transverse airflow holes 153, or without any transverse airflow holes along a section. In this way, the interior of each module can be subdivided into sub-regions between which there is no transverse airflow, each sub-region having at least one air exit to allow air to one of the air outlets 25. In this way a control system including airflow control valves can be used to selectively apply vacuum pressure not just to one or another of the modules, but to one or another of the sub-regions within a module.

Although illustrated as part of a vacuum lifting plate, the reinforcement structures described above can equally well be used in a vacuum hold-down plate.

With the punching process described above, the inside of the bore is naturally surrounded by a rim 96, which is a tubular projection of material drawn inside the die recess during the punching process. Punched bores of this type are sometimes called "pierced" or "lunged" bores. Because the rim 96 extends above the level of the surrounding inner first surface 57 of the lower wall 22 of the vacuum plate 10, this tubular extension naturally acts as a barrier (a dam) against migration of adhesive 56. Therefore, the internal shape of the punched and drawn bores simplifies the next manufacturing step, when the punched, vacuum plate is bonded to internal reinforcement, for example cellular reinforcement such as the honeycomb matrix.

In the example given above, the punched bores have a circular symmetry. It would, however, be possible to provide punches and dies with different shapes particularly for the funnel entrance, for example with hexagonally symmetric, triangular or square.

The recess may also, or alternatively, have a non-circular shape. There is relatively little lateral flow of metal in the formation of the recess, which may be only 0.25 mm deep, and so it is particularly feasible to vary the shape of the recess periphery to increase the surface area of the applied vacuum pressure. A manufacturer of vacuum plates may also incorporate a decorative feature, such as a company logo, in the outer shape of the recess.

Another advantage resulting from the formation of the recess is that the drawing process terns to harden the surface of the metal, which improves wear characteristics.

A funnel entrance with hexagonal or square sections through the axis of the bore would have a larger surface area as compared with a circular bore no larger than the periphery of a non-circular bore, which would increase vacuum lifting force once the airflow through the bore is impeded by the lifted sheet material article. It is, however, still preferred if the main part of the bore has a frusto-conical or cylindrical shape as this will tend to minimize the surface area of the main part of the bore of the suction hole, and therefore also the resistance to airflow through the suction hole.

A further advantage of the pierce and draw process described above is that essentially no metal is lost. Drilling a hole and then chamfering the entrance results in loss of metal and thinning of the plate around the hole, which makes the vacuum plate weaker. Not only does the pierce and draw process avoid this loss, and the need to clean away waste metal particles, but the resulting non-planar shape of the metal in the vicinity of the suction hole increases strength and resistance to flexing of the plate. Another possibility for improving strength is the formation of laterally elongate holes and/or recesses to create laterally extending rib-like profiles in the sheet.

As a result, the vacuum plate is stronger than a drilled plate of the same thickness, allowing less robust internal reinforcement to be used, which may therefore result in less resistance to transverse airflow.

It should be noted that the above detailed description has been given by way of example only, and that the principles of the invention may be applied to other types of vacuum plates, for example, vacuum hold-down plates or vacuum rollers, or vacuum plates not having a modular construction or having different types of internal reinforcement. The invention may also be employed with different types of sheet handling apparatus, for example with vacuum lifting plates which are moved linearly on a gantry instead of at the end of a robot arm.

The invention therefore helps to provide a relatively lightweight and economical vacuum plate having good vacuum suction at the array of suction or vacuum holes.

LISTING OF REFERENCE NUMERALS 1 vacuum plate sheet material handling system
2 vacuum sheet material handling apparatus
3 strips of metal used to form square grid reinforcement
4 sheet material articles
5 slots in strips
6 stack of sheet material articles
7 first surface of metal plate in which array of suction holes is formed
8 sheet material handling actuation system
9 second surface of metal plate
10 vacuum plate
12 five-axis robotic arm
14 control system
16 source of negative air pressure
18 first (lower) side of the vacuum plate
19 second (upper) side of the vacuum plate
20 vacuum surface (downwardly oriented) of the vacuum plate
21 mounting surface (upwardly orientated) of the vacuum plate
22 first (lower) wall of the vacuum plate
23 second (upper) wall of the vacuum plate
24 bores defining an array of suction holes in the first wall of the vacuum plate
25 array of air exit holes in the second wall of the vacuum plate
26 upper surface of the sheet material articles
27 first long edge of the vacuum plate
28 second long edge of the vacuum plate
29 pull of sheet material article to the vacuum plate
30 upper chassis
31 first short edge of the vacuum plate
32 second short edge of the vacuum plate
33 four corners or vertexes of the vacuum plate
34 central portion of the chassis
35 upwardly facing mounting bracket
36 manipulating end of the robotic arm
37 air outlet of the chassis
38 flexible hose of the airflow suction system
39 air channels between chassis and vacuum plate
40, 140 vacuum plate module
41 upper wall of the chassis
42 first (lower) clamshell plate of the vacuum plate modules
43 second (upper) clamshell plate of the vacuum plate modules
44 first (lower) rim extending upwardly from lower wall of vacuum plate module
45 second (upper) rim extending downwardly from lower wall of vacuum plate module
46 adhesive affixing chassis to the mounting surface of the vacuum plate
47 upward extensions of the first rim
48 seams between adjacent vacuum plate modules
49 hollow interior of vacuum plate
50 honeycomb reinforcing structure
150 grid reinforcing structure
51 hexagonal cells of honeycomb reinforcing structure
151 square cells of grid reinforcing structure
52 vertically extending walls of hexagonal cells
152 vertically extending interlaced linear walls
53 lateral apertures or holes in hexagonal cell walls
153 lateral apertures or holes in square cell walls
54 first (lower) ends of hexagonal cell walls
154 first (lower) ends of square cell walls
55 second (upper) ends of hexagonal cell walls
155 second (upper) ends of square cell walls
56,156 adhesive for bonding cell walls to module housing inner surfaces
57 second inner (upper) surfaces provided by the first wall of the vacuum plate
58 first inner (lower) surfaces provided by the second wall of the vacuum plate
59 outer frame for honeycomb reinforcing structure
60, 160 vacuum plate module housing
61 corner reinforcement tabs
62 branched ends or lobes of chassis providing air manifold 63, 163 punch and die press
64 sheet of metal to be formed into the lower wall of the vacuum plate
65, 165 punch carriage
66, 166 springs
67 tip of the punch
68 conical tip portion of punch
69 middle portion of punch
70, 170 punch
71 punch matrix having nine punches
72 bore surrounding the punch
73, 173 punch block
74, 174 first anvil surface
75 opening of the bore surrounding the punch
76 punch axis
77 expanded portion of punch
78 stem portion of the punch
79 step between the expanded and stem portions of the punch
80, 180 die
81 die matrix having nine dies
82 recess of the die
83, 183 die block
84, 184 second anvil surface
85 opening of the recess of the die
86 die axis
87 perimeter of die recess
88 peripheral wall of die
89 main portion of the bore of the suction hole
90 ram for driving the punch carriage
91 airflow entrance to the main cylindrical portion of the bore of the suction hole
92 stepped recess
93 planar surface of metal plate surrounding the bore
94 substantially cylindrical wall of the stepped recess
95 substantially right-angled transition at base of stepped recess
96 rim around the inside of the punched bore
97 outer shoulder of the punch
98 tubular ring of material around the punched bore
99 airflow exit of the punched bore
100 airflow into the punched bore

The invention claimed is:

1. A vacuum plate for handling a sheet material article, the vacuum plate comprising a first wall, a plurality of vacuum holes in the first wall each of said holes being defined by a bore extending through the first wall between opposite first and second sides of the first wall, and at least one air outlet for connection to a source of vacuum pressure for applying a vacuum pressure to said bore from the second side of the first wall whereby the first wall provides, in use, a vacuum surface for pulling and holding said article to the vacuum surface when said vacuum pressure is applied to said bore, wherein said bore comprises:
   a flared entrance terminating at the vacuum surface for admitting air pulled through said bore by said applied vacuum pressure; and
   opposite said entrance, an exit for said air pulled through said bore, said exit being surrounded by a rim that extends above a surrounding surface of the second side of the first wall.

2. A vacuum plate as claimed in claim 1, in which the first wall is of a metallic material, and said rim is a tubular projection of said material.

3. A vacuum plate as claimed in claim 2, in which said tubular projection has opposite inner and outer surfaces, the inner surface providing an extension of said bore and the outer surface extending away from said surrounding surface.

4. A vacuum plate as claimed in claim 1, in which the flared entrance comprises a stepped recess whereby a flared portion of said entrance is recessed from the vacuum surface by a step in the vacuum surface.

5. A vacuum plate as claimed in claim 1, in which the flared entrance is bell-shaped.

6. A vacuum plate as claimed in claim 1, further comprising a second wall, the first and second walls being spaced apart from each other in a substantially parallel orientation, the second wall comprising at least one air exit hole providing said air outlet.

7. A vacuum plate as claimed in claim 6, further comprising a reinforcing structure between said first and second walls, the reinforcing structure being affixed by an adhesive to said surrounding surface of the second side of the first wall.

8. A vacuum plate as claimed in claim 7, in which the reinforcing structure is a honeycomb structure having an array of hexagonal cell walls, a first end of said cell walls being affixed by said adhesive to said surrounding surface of the second side of the first wall, and a second end of said cell walls being affixed by an adhesive to a first surface of the second wall, said first ends of said cell walls skirting the rims of each one of said bores.

9. A vacuum plate as claimed in claim 7, in which no adhesive extends over each rim, to the adhesive thereby not impeding airflow through the corresponding hole.

10. A vacuum plate as claimed in claim 1, in which the vacuum plate is a vacuum lifting plate, and the first wall is a lower wall providing, in use, a vacuum surface that is a vacuum lifting surface for lifting and holding said article to the vacuum lifting surface.

11. A vacuum plate as claimed in claim 1, in which the vacuum plate is a vacuum hold-down plate, and the first wall is an upper wall providing, in use, a vacuum surface that is a vacuum hold-down surface for pulling down and holding said article to the vacuum hold-down surface.

12. A vacuum plate as claimed in claim 1, in which the flared entrance of the bore is fully recessed within the vacuum surface.

13. A vacuum sheet material handling apparatus for handling sheet material, comprising a vacuum plate and a source of vacuum pressure, the vacuum plate comprising a first wall, a plurality of vacuum holes in the first wall each of said holes being defined by a bore extending through the first wall between opposite first and second sides of the first wall, the source of vacuum pressure being configured to apply a vacuum pressure to said bores from the second side of the first wall, whereby the first wall provides, in use, a vacuum surface for pulling and holding said article to the vacuum surface when said vacuum pressure is applied to said bores, wherein said bore comprises:
   a flared entrance terminating at the vacuum surface for admitting air pulled through said bore by said applied vacuum pressure;
   opposite said entrance, an exit for said air pulled through said bore, said exit being surrounded by a rim that extends above a surrounding surface of the second side of the first wall; and
   the source of vacuum pressure being connected to said at least one air outlet for applying said vacuum pressure from the second side of the first wall.

14. A vacuum sheet material handling apparatus for handling sheet material, comprising a vacuum plate and a source of vacuum pressure, the vacuum plate comprising a first wall, a plurality of vacuum holes in the first wall each of said holes being defined by a bore extending through the first wall between opposite first and second sides of the first wall, and at least one air outlet for connection to a source of vacuum pressure for applying a vacuum pressure to said bore from the second side of the first wall whereby the first wall provides, in use, a vacuum surface for pulling and holding said article to the vacuum surface when said vacuum pressure is applied to said bore, wherein said bore comprises:
   a flared entrance terminating at the vacuum surface for admitting air pulled through said bore by said applied vacuum pressure; and
   opposite said entrance, an exit for said air pulled through said bore, said exit being surrounded by a rim that extends above a surrounding surface of the second side of the first wall; wherein the source of vacuum pressure is connected to said at least one air outlet for applying said vacuum pressure from the second side of the first wall.

15. A method of making a vacuum plate for handling a sheet material article, the vacuum plate comprising a first wall, a plurality of vacuum holes in the first wall each one of said holes being defined by a bore extending through the first wall between opposite first and second sides of the first wall, and at least one air outlet for connection to a source of vacuum pressure for applying a vacuum pressure to said bores from the second side of the first wall, the first wall providing, in use, a vacuum surface for pulling and holding said article to the vacuum surface when said vacuum pressure is applied to said bores, wherein the method comprises:
   holding a metallic sheet between at least one aligned punch and die, the metallic sheet having opposite first and second sides and the punch extending along a punch axis and comprising around said axis: (i) a substantially V-shaped tip; (ii) extending axially away from the V-shaped tip a middle portion being substantially parallel with said axis; (iii) extending axially away from the middle portion, an expanded portion having a profile that flares away from said axis; and (iv) at the end of the expanded portion an axially extending step;
   pressing the V-shaped tip of the punch into the first side of said held metallic sheet along a punching direction aligned with an axis of the die to pierce the metallic sheet and start to draw material of the metallic sheet into a die recess around said bore pierced through the metallic sheet;
   continue to press the punch along said punching direction as the middle portion of the punch enters said bore until said profile of the expanded portion of the punch impresses an expanded entrance around said bore, the clearance between the middle portion of the punch and the die recess being sufficient such that said drawn material forms a rim of said bore, said rim being raised relative to a surrounding surface of the second side of the metallic sheet around said bore, and;
   continue to press the punch along said punching direction until the axially extending step of the punch impresses a step around said expanded entrance, thereby axially recessing said expanded entrance relative to the surface of the metallic sheet surrounding the bore;
   withdrawing the punch from the bore;
   repeating, if necessary, the above steps to create said plurality of bores in said metallic sheet, and then using said metallic sheet to provide said first wall in the vacuum plate with the first side of the metallic sheet providing the first side of the first wall, so that when said at least one air outlet is connected to a source of vacuum pressure, the first side of the first wall provides, in use, a vacuum surface for pulling and holding sheet material articles to the vacuum surface.

16. A method as claimed in claim 15, in which said expanded portion has a concave profile that flares away from said axis, and the method comprises the step of pressing the punch along said punching direction until the concave profile of the expanded portion of the punch impresses a convexly expanded entrance around said bore.

17. A method as claimed in claim 15, in which the rim is formed as a tubular ring of material around said bore, said ring extending in an axial direction away from a surrounding surface of the metallic sheet around said bore.

18. A method as claimed in claim 15, in which the vacuum plate further comprises a second wall, the method comprising the steps of:
   spacing apart the first and second walls in a substantially parallel orientation; and
   providing said at least one air outlet in the second wall.

19. A method as claimed in claim 18, in which the vacuum plate further comprises a reinforcing structure spanning said first and second walls, the method comprising:
   using an adhesive to affix the reinforcing structure to a second side of the first wall.

20. A method as claimed in claim 19, in which the reinforcing structure is a honeycomb structure having an array of hexagonal cell walls, the method comprising:
   affixing the reinforcing structure to a second side of the first wall by placing a first end of said cell walls on said surrounding surface of the second side of the first wall;
   with the first end of said cell walls placed on said surrounding surface of the second side of the first wall, using said adhesive to affix the first end of said cell walls to said surrounding surface.

* * * * *